METHOD AND APPARATUS FOR SYNCHRONIZING TELEVISION SIGNALS

Filed Oct. 9, 1967 11 Sheets-Sheet 1

INVENTOR
BUCK C. BROWN

BY Arnold, Roylance, Kruger & Durkee
ATTORNEYS

INVENTOR
BUCK C. BROWN
BY Arnold, Roylance, Kruger & Durkee
ATTORNEYS

METHOD AND APPARATUS FOR SYNCHRONIZING TELEVISION SIGNALS

Filed Oct. 9, 1967 11 Sheets-Sheet 3

INVENTOR
BUCK C. BROWN

BY Arnold, Roylance, Kruger & Durkee
ATTORNEYS

INVENTOR
BUCK C. BROWN

BY Arnold, Roylance, Kruger & Durkee
ATTORNEYS

METHOD AND APPARATUS FOR SYNCHRONIZING TELEVISION SIGNALS

Filed Oct. 9, 1967 11 Sheets-Sheet 5

INVENTOR
BUCK C. BROWN

BY Arnold, Roylance, Kruger & Durkee
ATTORNEYS

| A | B | C | GATED ERROR OUTPUTS |
|---|---|---|---|
| 0 | 0 | 1 | GATE 1 |
| 0 | 1 | 0 | GATES 1-2 |
| 0 | 1 | 1 | GATES 1-3 |
| 1 | 0 | 0 | GATES 1-4 |
| 1 | 0 | 1 | GATES 1-5 |
| 1 | 1 | 0 | GATES 1-6 |
| 1 | 1 | 1 | GATES 1-7 |

| A | B | C | DECODER OUTPUTS | |
|---|---|---|---|---|
| 0 | 0 | 1 | GATE 1 | 7.2 Hz |
| 0 | 1 | 0 | GATE 2 | 72 Hz |
| 0 | 1 | 1 | GATE 3 | 287 Hz |
| 1 | 0 | 0 | GATE 4 | 1.4 KHz |
| 1 | 0 | 1 | GATE 5 | 7.2 KHz |
| 1 | 1 | 0 | GATE 6 | 29 KHz |
| 1 | 1 | 1 | GATE 7 | 230 KHz |

INVENTOR
BUCK C. BROWN
BY Arnold, Roylance, Kruger & Durkee
ATTORNEYS

METHOD AND APPARATUS FOR SYNCHRONIZING TELEVISION SIGNALS

Filed Oct. 9, 1967 11 Sheets-Sheet 7

INVENTOR
BUCK C. BROWN

BY Arnold, Roylance, Kruger & Durkee
ATTORNEYS

INVENTOR
BUCK C. BROWN

BY Arnold, Roylance, Kruger & Durkee
ATTORNEYS

INVENTOR
BUCK C. BROWN
BY Arnold, Roylance, Kruger & Durkee
ATTORNEYS

INVENTOR
BUCK C. BROWN

BY Arnold, Roylance, Kruger & Durkee
ATTORNEYS

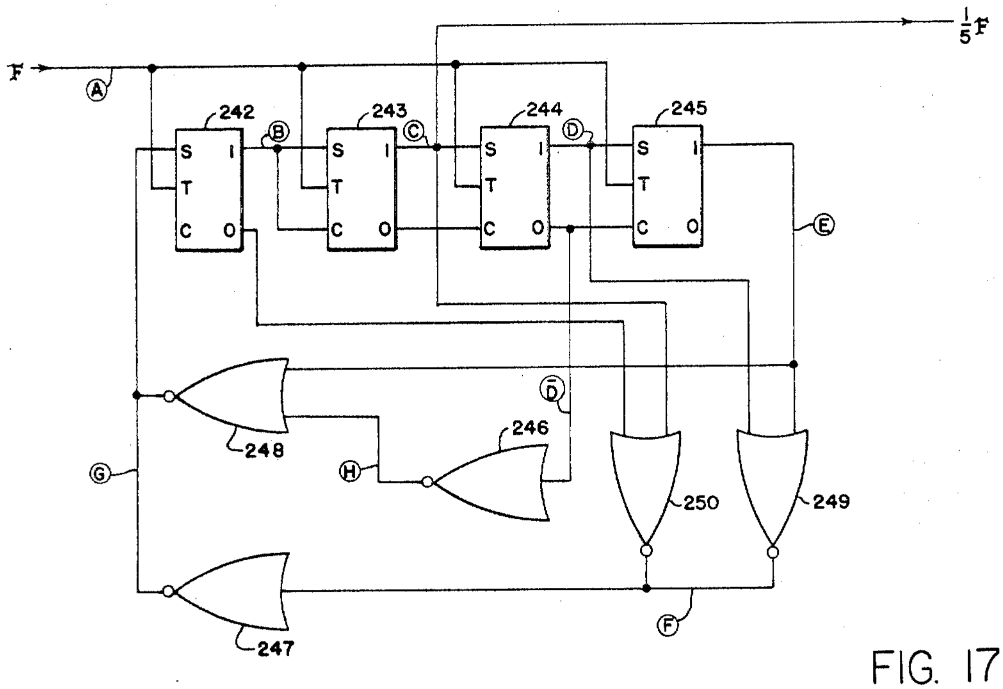
FIG. 17
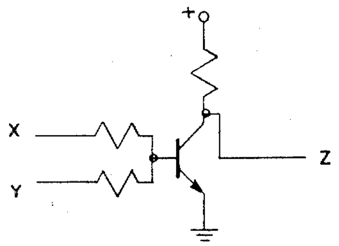
FIG. 19
| X | Y | Z |
|---|---|---|
| I | I | O |
| I | O | O |
| O | I | O |
| O | O | I |
FIG. 20
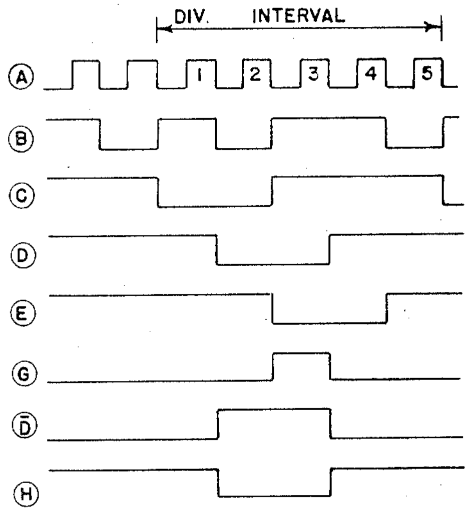
FIG. 21
INVENTOR
BUCK C. BROWN
BY *Arnold, Roylance, Kruger & Durkee*
ATTORNEYS

United States Patent Office 3,525,808

Patented Aug. 25, 1970

3,525,808

METHOD AND APPARATUS FOR SYNCHRONIZING TELEVISION SIGNALS

Buck C. Brown, Rockville, Md., assignor to Tracor, Inc., Austin, Tex., a corporation of Texas Filed Oct. 9, 1967, Ser. No. 673,752

Int. Cl. H04n 5/04

U.S. Cl. 178—69.5 11 Claims

ABSTRACT OF THE DISCLOSURE

A system for phase-locking the synchronizing signals of one or more remotely located television program sources with the synchronizing pulses of a central or master program source in which a particular synchronizing pulse having unique time location characteristics is isolated from both the remote and master signal sources, the two isolated pulses being compared to determine a phase error. A correction signal is developed representative of the direction of the phase error and converted into audio frequency tones. The audio signals are transmitted over low quality transmission lines to the remote video source location where the tones are reconverted into a correction signal used to shift the phase of the remote source synchronizing signals.

This invention relates to the art of synchronizing television signals and provides a method and apparatus particularly useful in the provision of concurrent television coverage from a central program source and one or more remote program sources.

In television programming, it is frequently desirable to cover two or more events concurrently, providing the viewer with pictures of all of the events simultaneously. Such concurrent coverage is particularly important when live transmission is employed, as opposed to video tape-recorded and delayed transmission. In providing simultaneous video coverage, the video and audio information from two or more sources is received and parts of some of the picture-produced lines are employed for one scene and the remainder of the lines are employed for a different scene so that two or more images appear simultaneously on the screen of the viewer's receiver. Thus, for example, the scene depicting one event can occupy the left half of the screen while the image of the second event occupies the right half of the screen. Additional events can be displayed in smaller areas, such as the upper or lower corners of either of the two primary half-screen pictures. Alternatively, one picture can occupy the upper half of the receiver screen while another picture is displayed on the lower half of the screen. Techniques for accomplishing such "picture splitting" are well known and will not be further described here.

When only a single transmitting location is involved, no particular problems are encountered in providing concurrent television coverage. And, when only a central program source and one remote program source are involved, only problems of maintaining adequate picture quality ordinarily arise. However, when more than one remote program source must be employed, with video information from those sources being relayed to a central program location, the remote sources must be independently synchronized to the central location. Though proposals have been made for adjusting the phase of the signal from the central program source to that of the signal from the remote source, it has proved very difficult and expensive. Furthermore, this procedure has not generally been usable under circumstances where more than one remote program source is employed.

It is accordingly a general object of this invention to devise an improved method and apparatus for synchronizing the signals of at least one remote television program source and a master or central program source in such fashion that adequate synchronization and picture quality is maintained.

Another object is to provide a method and apparatus whereby the synchronizing signals of two or more remote video program sources are caused to coincide in time phase sequence with the synchronizing signals produced at a central program source.

A further object is to accomplish phase-locking of two or more remote television program sources and a central television source so that the programs from all of the sources can be mixed, faded, superimposed, or otherwise combined with each other, or with a program having its source at the central location.

Yet another object is to provide apparatus for phase-locking a plurality of geographically separated video program sources, utilizing a relatively low quality transmission line, such as a conversation quality telephone line, for signal synchronization.

Another object is to provide apparatus for locking, in time and phase relationship, the synchronizing signals of two or more video sources with the synchronizing signals of a master video source wherein it is inconvenient or impractical to provide more than one microwave transmission means for each source.

A still further object is to provide a method and apparatus for time-phase locking two or more television signal sources in which the real time separation between corresponding pulses in signals generated by the two or more sources is detected, an error signal representative of the separation is generated and converted to a code form suitable for transmission by low quality transmission media, the code form is received and interpreted, and the separation is reduced at a rate determined by the magnitude of the separation.

Another object is to provide a method of isolating one of the pulses from the plurality of synchronizing pulses produced by a remote video source, isolating a counterpart pulse from the pulses produced by a master video source, comparing the isolated pulses to derive an error signal and converting the error signal to a suitable form for transmission to the remote source at which the pulses generated at the remote source are advanced or retarded to reduce the error.

In conventional television transmission, two synchronizing pulse trains or groups are generated during each picture frame, one for each field used in the conventional scanning technique employed in modern television equipment. The two pulse trains or groups include horizontal synchronizing pulses, vertical pulses, and equalizing pulses, equal numbers of each of these types of pulses being present in each group. While the various types of pulses are present in equal numbers, their time relationships differ in a particular manner so that the pulse group for the first field is different from the pulse group for the second field, this difference resulting in presence of at least one pulse which is unique in each group in the sense that that pulse has no time counterpart in the pulses of the other groups.

In accordance with method embodiments of the invention, video signals are produced at two different program sources or locations, at least one such unique synchronizing pulse is detected from each of the video signals with the unique pulses detected from the signals being pulses which correspond to each other, an error signal is generated having a characteristic representative of the time displacement between the unique pulses, and the phase of the video signal produced at one location is shifted in response to the error signal to bring the synchronizing pulses of that video signal into time phase coincidence with the synchronizing pulses of the video signal produced at the other location. Advantageously, detection of the unique pulses from both signals and generation of the error signal are accomplished at the central program source, the error signal is converted into an audio signal, and the latter is transmitted to the remote program location via a low quality transmission line, e.g., a telephone line, the audio signal being reconverted to a meaningful error signal at the remote program location.

Apparatus embodiments of the invention perform the synchronizing operation by accepting the video information from the master or local program source, accepting the received video signals transmitted from the remote video program source, isolating from these two sources at least one unique pulse from each source, and comparing the time location of the unique pulse from the remote video source with that of the unique pulse from the master source. If a time difference exists between these pulses, an error signal is developed which has a characteristic proportional to the time separation. A correction signal is then generated, the correction signal having a characteristic representative of the error characteristic of the error signal. The significant characteristic of the correction signal is then reduced to an audio signal which is of such a nature as to be suitable for transmission over a conventional low quality transmission line such as a conversation quality telephone line. The signal transmitted over the transmission line is of such a nature that the distance between the master and remote program sources has no degenerative effect on the intelligence contained within the signal. The signal is received at the remote location and an analysis process is followed which is similar to the synthesis process at the master location. A correction signal is again generated and is connected to the 31.468 kHz. synchronizing signal generating apparatus at the remote video program source, the correction signal being effective to shift the time location of the synchronizing pulse train in a desired direction and by an appropriate magnitude to synchronize with the equivalent synchronizing pulse train generated by the master video equipment.

It will be recognized by those skilled in the television art that any one or more than one pulse or pulses could be selected from a television signal because, in a sense, each pulse is unique in its location among the synchronizing pulses. However, a pulse unique to one field as compared with the other is selected in the following detailed discussion because this presents a simpler solution.

In order that the manner in which the foregoing and other objects are attained in accordance with the invention can be understood in detail, a particularly advantageous embodiment thereof will be described with reference to the accompanying drawings, which form a part of this specification, and wherein:

FIG. 17 is a simplified schematic diagram of the divider portion of the time shift unit of FIG. 15;

FIG. 19 is a schematic diagram of a logic circuit usable in the apparatus of the invention;

FIG. 20 is a truth table for the circuit of FIG. 19; and

FIG. 21 is a waveform diagram showing the time relationship of pulses occurring in the apparatus of FIG. 17.

Figure 1:
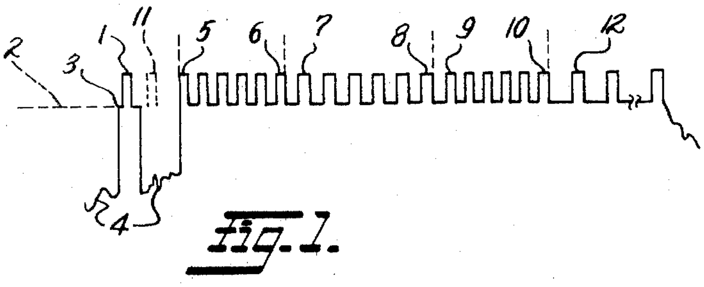
FIG. 1 is a waveform diagram showing a portion of a typical video signal with synchronizing pulses.

The waveform diagram of FIG. 1 shows a typical series of signals which exists in every television transmission operated in accordance with the United States standards. The waveform includes a horizontal synchronizing pulse 1 which is the last of a series of horizontal pulses which rise above a preselected level established as the black level indicated at 2. The horizontal synchronizing pulse rises from a blanking pedestal which turns off the electron beam in a television receiver tube during retrace. Between blanking pulses, the video picture information 4 provides variations in intensity which form the visual lines on the receiver screen to generate the visible picture.

In generating a picture image, the scanning beam is caused to trace from one side of the screen to the other in a sequentially generated series of lines which are spaced apart vertically, that is, in a direction from the top to the bottom of the screen.

The predetermined pattern of scanning lines which provide substantially uniform coverage of the image area is known as raster. In the modern United States television system, 525 lines constitute the scanning raster. Each complete 525 line picture image is known as a frame. The complete scanning operation for one frame, i.e., 525 scanned lines, occurs during two periods of time known as the first and second fields. The electron beam sequentially scans all of the odd-numbered lines of the 525 line frame during the first field. The beam is then retraced to the top of the screen and the sequential line scanning is repeated, forming a second field, the lines of which are positioned between the lines generated during the first field. This overall scanning operation is known as interlaced scanning. At the beginning of the first field, a series of synchronizing pulses is produced, such as those shown in FIG. 1, beginning with a train of six equalizing pulses beginning with pulse 5 and ending with pulse 6. These equalizing pulses are followed by six vertical synchronizing pulses beginning with pulse 7 and ending with pulse 8, the next series of pulses beginning at 9 and ending at 10 constituting the remaining equalizing pulses. Thereafter, more horizontal pulses are produced with the accompanying picture information. The functions of the various synchronizing pulses 5–10 are well understood by those skilled in the art and need not be further described here.

The synchronizing pulses for the second field are similar to those described for the first field except that the spacing between the last horizontal pulse 1 and the first equalizing pulse is only half as great as in the first field. This is indicated by the dotted line pulse 11 in FIG. 1. Thus, the synchronizing pulses for the second field are shifted to the left, as seen in FIG. 1, by one-half of the distance between the leading edge of pulse 1 and the leading edge of pulse 5, all of the equalizing and vertical pulses being shifted by this same amount. The net result is a greater space of time between the last equalizing pulse 10 and the first horizontal pulse 12. Further, pulse 11 is unique to the second field and pulse 10 is unique to the first field, considering the particular time locations of the two pulses.

Figure 2:
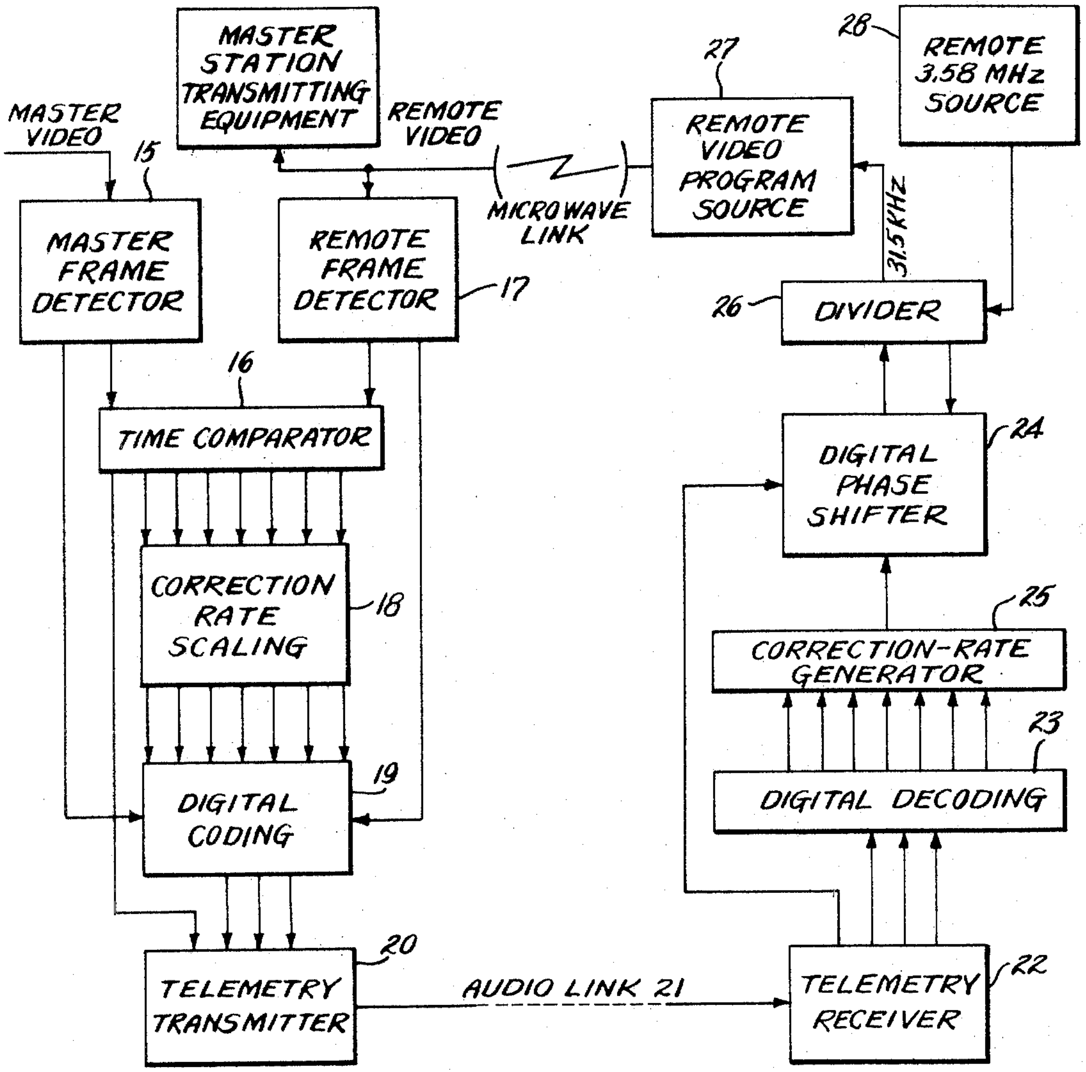
FIG. 2 is a schematic diagram of an apparatus in accordance with the present invention in simplified form.

The apparatus generally shown in FIG. 2 makes use of this unique time characteristic to synchronize the signals. It will be recognized that, for proper operation of a television system, the synchronizing pulses generated by the apparatus at a master station must be precisely aligned with the synchronizing pulses generated by the apparatus at a remote program source. It is not enough that at least one of the equalizing pulses from the remote source first field be aligned with any one of the equalizing pulses from the master source first field. It is essential that each equalizing pulse from the remote source first field be aligned with each counterpart equalizing pulse from the first field of the master source.

The apparatus of FIG. 2 performs this special synchronization. The video signal from the master video source is applied to the input terminal of a master frame detector unit 15 which first separates the vertical, horizontal and equalizing synchronizing pulses from the blanking pulses and picture information and provides the vertical, horizontal, and equalizing synchronizing pulses, called the composite sync output, to a later portion of the system. Detector 15 then isolates at least one of the unique pulses from the composite sync signals and provides this result to one input of a time comparator unit 16. The video information generated by the remote source 27 is transmitted by microwave means, such as a coaxial cable or a microwave link, to the receiving equipment at the master station where it is combined with locally generated signals or is otherwise processed for retransmission. The remote video signal is also coupled into a remote frame detector unit 17 which similarily extracts the composite sync output from the remote video and isolates at least one unique pulse from the composite sync and supplies that signal to the second input of time comparator unit 16. The master and remote frame detectors 15 and 17 can be identical units and will be regarded as such herein.

Time comparator unit 16 receives the pulse information from units 15 and 17 and compares this information to derive a raster error pulse, the time duration of which is representative of the time separation of the unique pulses provided to it. Unit 16 then generates one or more of seven possible output signals, the number of output signals generated being representative of the duration of the raster error pulse. These outputs are connected to a correction rate scaling unit 18 which converts the output signals from unit 16 to a form in which they can be encoded digitally, whereupon they are delivered to a digital encoding unit 19. Unit 19 also receives the composite sync output signals from units 15 and 17, which are checked in unit 19 to prevent the generation of a correction signal if the video information from either of the master or remote video sources is lost. Digital coding unit 19 includes encoding matrix means for producing a three-bit binary word, the code of which is representative of the existing ones of the seven possible output signals from the correction rate scaling unit. A fourth pulse signal is provided by the time comparator unit to indicate the direction of the error of the raster error pulse. The four signals, constituted by the three-bit binary word and the fourth pulse signal, are connected to a telemetry transmitter unit 20 which converts them into corresponding audio frequency tone signals which are suitably amplified and connected to a conventional low quality transmission line such as a conversation quality telephone line forming audio link 21. The audio frequency signals are received by a telemetry receiver unit 22 which detects and identifies the audio tone signals and produces a binary code, three elements of which are coupled to a digital decoding unit 23. The fourth code element, indicative of direction of the error, is connected to a digital phase shifter unit 24. Decoding unit 23 reconverts the three-bit binary word into a plurality of code signals. The code signals are coupled to a correction rate generator 25 which produces a signal indicative of the magnitude of the time separation between the unique synchronizing pulses of the remote and master station. This rate error signal, together with the direction error signal from the telemetry receiver, is connected to digital phase shifter 24 which cooperates with a variable digital divider circuit 26 to produce an external sync signal for the conventional sync signal generating apparatus in the remote video program source 27. A 3.58 mHz. clock source 28 at the remote unit is utilized by divider circuit 26 in a manner which will be described in greater detail below.

Figure 3:
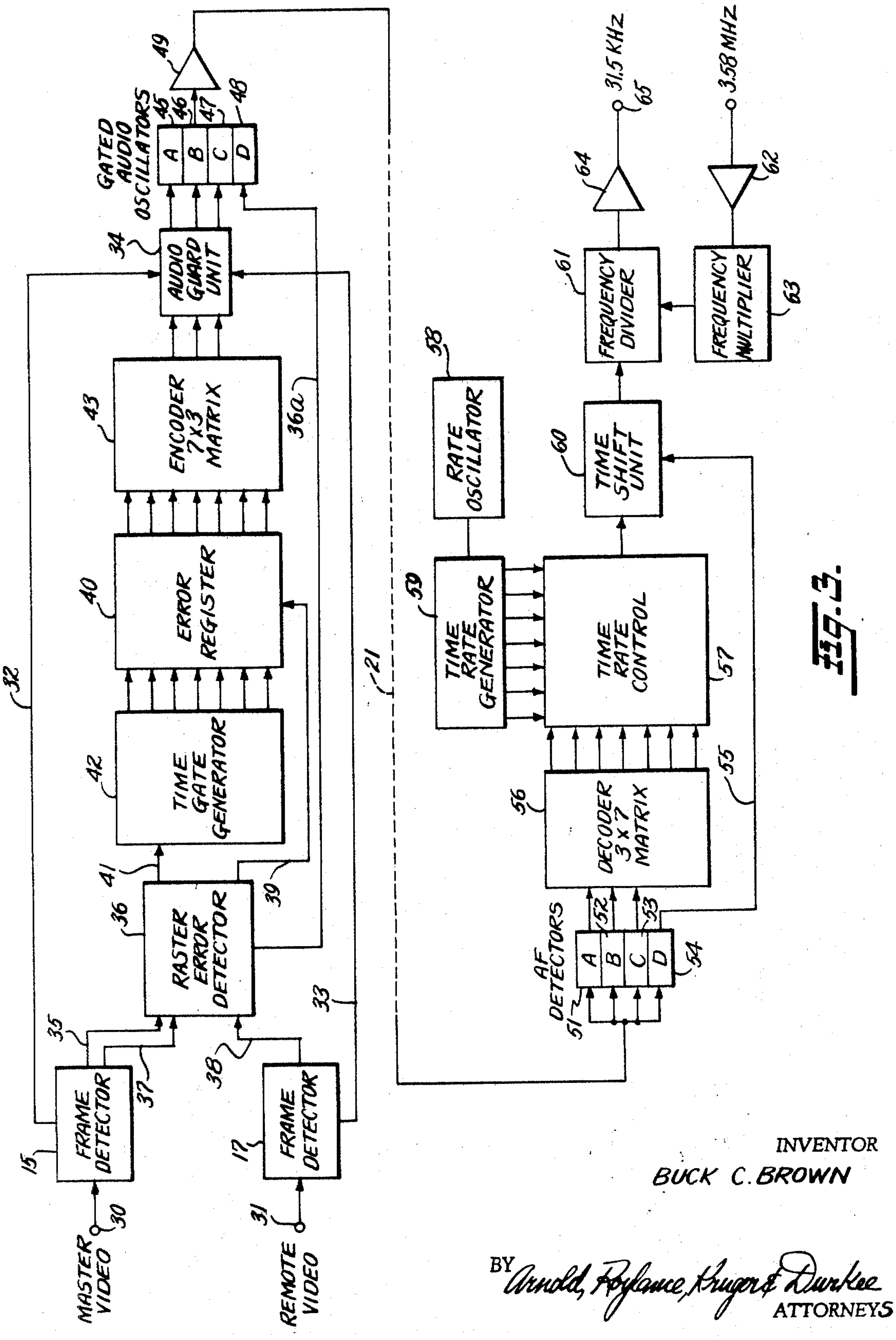
FIG. 3 is a schematic diagram of a portion of the system of FIG. 2 in greater detail.
Figure 4:
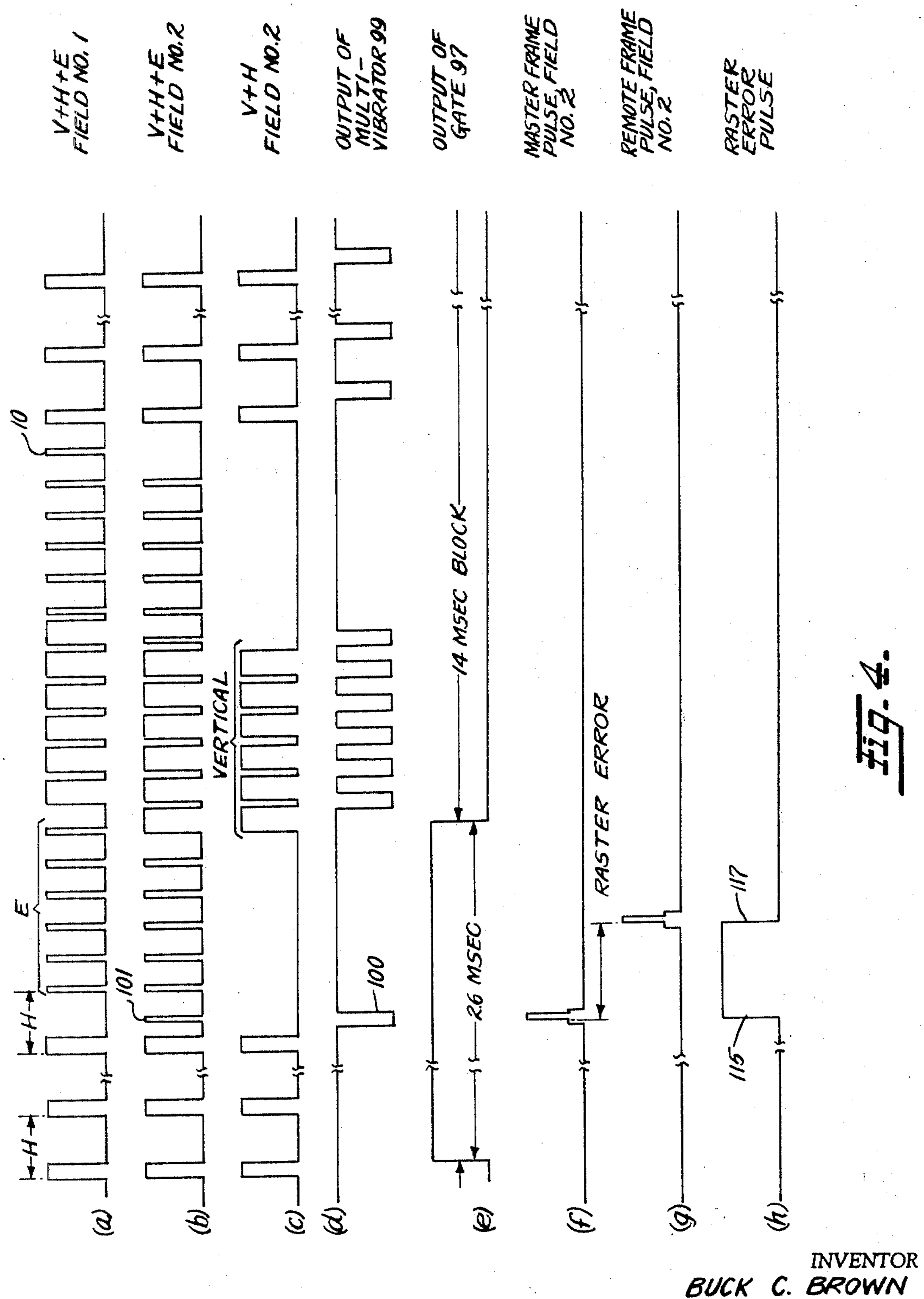
FIGS. 4 and 5 are waveform diagrams showing the interrelationship of pulses which are analyzed and generated in apparatus in accordance with the invention.

FIG. 3 shows the system in greater detail, the master video information being connected to an input terminal 30 and then to the input of frame detector 15. The remote video signal is connected to an input terminal 31 at frame detector 17. As previously described, one or more of the unique pulses in the first and second field synchronizing pulse trains can be selected. In the apparatus to be described, the first pulse of the second field will be selected as the basic pulse for establishing time error. The waveforms in FIG. 4 can be referred to concurrently with FIG. 3. In FIG. 4, the pulses in waveform 4(*a*) are the vertical, horizontal and equalizing pulses in the first field of a video signal, with blanking pulses and video information removed. FIG. 4(*b*) shows the vertical, horizontal and equalizing pulses in the second field. FIGS. 4(*a*) and 4(*b*) could be the synchronizing pulses for either the master or the remote source. However, for purposes of this dicussion, these pulses will be taken as representing the master video signal. Comparing FIGS. 4(*a*) and 4(*b*), it will be seen that the horizontal pulses are normally spaced from each other by a time H which is standard throughout the television industry at approximately 64 microseconds. It will also be seen that the leading edges of the last horizonttal pulse and the first equalizing pulse are separated by a time H in field number one, but that in field number two the separation is one-half H. The equalizing pulses are of very short duration, on the order of .04 H, so that the first equalizing pulse of the second field begins and ends during an interval in which the synchronizing pulses of the first field have no equivalent pulse. Thus the first equalizing pulse of the second field has a unique time location characteristic.

The same can be said of the last equalizing pulse of the second equalizing pulse group of the first field, although this characteristic will not be employed in the present embodiment of the invention.

The composite sync signals of FIGS. 4(*a*) and 4(*b*) are separated from the remaining video information in the frame detectors 15 and 17 and are carried by conductors 32 and 33 to an audio guard unit 34. The master video frame detector 15 produces two other output signals, one being the master frame pulse which is carried by a conductor 35 to an input terminal of the raster error detector. Frame detector 15 also separates the vertical sync pulses, shown as one section of FIG. 4(*c*), and provides these via a conductor 37 to a second input terminal of raster error detector 36. The remote frame detector produces a remote frame pulse which is provided in a conductor 38 to a third input terminal of raster error detector 36. The master and remote frame pulses are shown in FIGS. 4(*f*) and 4(*g*) with a representative raster error between them. It will be noted that in FIG. 4(*f*) the master frame pulse is exactly aligned with, and is essentially the same as, the first equalizing pulse of the second field shown in FIG. 4(b). The composite sync signal for the remote source is not shown.

Raster error detector 36 compares the time relationship of the pulses in FIGS. 4(f) and 4(g) and produces a raster error pulse shown in FIG. 4(h), the duration of this pulse being equal to the raster error illustrated in FIGS. 4(f) and 4(g). Unit 36 also produces a signal indicative of the time relationship of the master and remote frame pulses, this signal being of one type when the remote frame pulse leads the master frame pulse in time and of another type when the remote frame pulse lags the master pulse, as shown in FIGS. 4(f) and 4(g). This signal can be considered as an advance-retard pulse and is applied via conductor 36a to a later circuit.

The raster error pulse is coupled via conductor 39 to one input terminal of an error register unit 40. The raster error detector also produces a reference trigger pulse which is a pulse of relatively short duration, the leading edge of which coincides with the leading edge of the raster error pulse. The reference trigger pulse, shown in FIG. 5(b), is coupled on a conductor 41 to the input terminal of a time gate generator unit 42.

The time gate generator unit responds to the reference trigger pulse to produce a plurality of staggered pulses, shown in FIGS. 5(c)–5(i), of increasingly greater duration. Seven such pulses are generated by unit 42 and supplied respectively to seven separate output terminals, the leading edge of the first pulse being coincident in time with the reference trigger and the leading edge of each pulse being aligned with the trailing edge of the pulse which precedes it in time. From FIGS. 5(c)–5(i), it will be understood that the pulse of FIG. 5(c) is of the shortest duration, approximately 0.5 microsecond, and that the pulse duration increases to that of the longest pulse, shown in FIG. 5(i). An eighth pulse having a duration of approximately 10 microseconds is also produced by the time gate generator unit 42, this pulse being a shift pulse the leading edge of which coincides with the trailing edge of the widest pulse, that is, the pulse shown in FIG. 5(i). The eight pulses are coupled into the error register 40 which responds to those pulses and to the raster error pulse to produce as many as seven output signals, the actual number produced being a function of the duration of the raster error pulse. The error register requires that the raster error pulse and one of the pulses of FIGS. 5(c)–5(i) be present in order to produce an output on a given output terminal. A relatively short raster error pulse will produce an output signal from only one output terminal of the error register, whereas a slightly longer raster error pulse will produce two output signals, a still longer raster error pulse will produce three output signals, and so on up to a maximum of seven. The error signals produced on the seven output terminals are supplied to an error encoder and matrix unit 43 which maintains the information as to the number of output signals produced and provides these error signals at the same point in time. The seven input signals are applied to a matrix circuit, which is a conventional logic circuit capable of accepting seven inputs and converting these into a binary code sible combinations exist in three bits, seven of these being sible combinations exist in three bits, seven of these being usable to carry positive information. The 000 word is preferably not used.

The binary code including the three-bit words from unit 43 are conducted to an audio guard unit 34 which constitutes a gate circuit capable of conducting the three bits substantially unmodified to three output terminals so long as the composite sync signals on conductors 32 and 33 from the frame detector circuits are provided to the inputs of unit 34. When either or both of the composite synic signals are missing, the three-bit words are blocked by the audio guard unit. The three outputs of the audio guard unit are respectively connected to three gated audio oscillators 45, 46, and 47. The advance-retard signal produced by the raster error detector is coupled to a fourth gated audio oscillator 48. The audio oscillators can take either of two forms, one being an oscillator which is disabled unless a gating input signal is provided at which time the oscillator produces an audio frequency output signal. Alternatively, each audio oscillator can continuously produce audio frequency energy, this energy being blocked by a conventional gate circuit unless an input signal is provided. The latter circuit is preferred. The outputs of the audio oscillators appear when the input signal to its associated gate includes a high level (binary 1) or "true" signal from one of the outputs of the audio guard unit. The audio signals generated thereby are coupled together and connected to a conventional line amplifier 49 wherein they are amplified and connected to a transmission line 21.

The audio tone signals conducted by transmission line 21 are coupled into four audio frequency detectors 51–54, which constitute conventional tuned filter detectors each capable of responding to an audio tone of a particular frequency and, if a tone of that frequency is present, of generating a DC output. The outputs thus produced, being either present or absent, constitute a four-bit binary code. The detectors identified as A, B, C, and D include the same binary code generated by the matrix circuit in unit 43 plus the directional information provided on the advance-retard line. The advance-retard information is connected via conductor 55 to one input of a time shift unit 60 to be discussed hereinafter.

The three-bit word output from detectors A, B, and C is coupled into a decoder circuit 56 which constitutes a three by seven matrix, substantially the reverse of the coded seven by three matrix in unit 43. Unit 56 produces seven outputs having the information contained in the three-bit word, the seven outputs being provided as gate signals to seven inputs of a time rate control unit 57.

A rate oscillator unit 58 provides a continuous oscillating signal having a rectangular waveform at a single preselected frequency to time rate generator unit 59. Generator 59 includes a plurality of conventional bistable multivibrators cascaded so as to divide the frequency of the rate oscillator by six factors, providing the six divided signals and the original rate oscillator frequency to the time rate control unit as seven rate frequency signals. Each of the seven signals is gated by one of the seven inputs from decoder matrix 56 if a signal is present on the particular gate with which the frequency is associated. The signal thus gated is provided to the signal input terminal of a time shift unit 60 which generates a control signal as an input to a variable divider unit 61. A locally generated 3.58 mHz. clock signal is taken from the remote program source equipment, amplified in an amplifier 62, and multiplied by a conventional frequency multiplier circuit 63, the multiplied signal being connected to frequency divider circuit 61. Divider 61 responds to the gated control levels from time shift unit 60 to divide the multiplied clock signal by one factor if no error exists, by a second factor if an error exists in one direction and by a third factor if the error is in the other direction. The division by the second or third factors is intermittent and is performed at a rate determined by the frequency of the signal gated through time rate control unit 57. The normal division ratio of the variable divider 61 is constant, but periodic correction signals are provided at a rate controlled by the time rate control unit 57 to provide a correction signal for the synchronizing pulses. The output of divider 61 is amplified by a conventional amplifier 64, further divided, and provided at an output terminal 65. The signal at terminal 65 is then connected to the 31.468 kHz. signal generator within the remote program source equipment and acts as a driving signal for that generator to cause it to change the phase of the remote video source program synchronizing signals to coincide with the phase of the master station video synchronizing signals.

Figure 6:
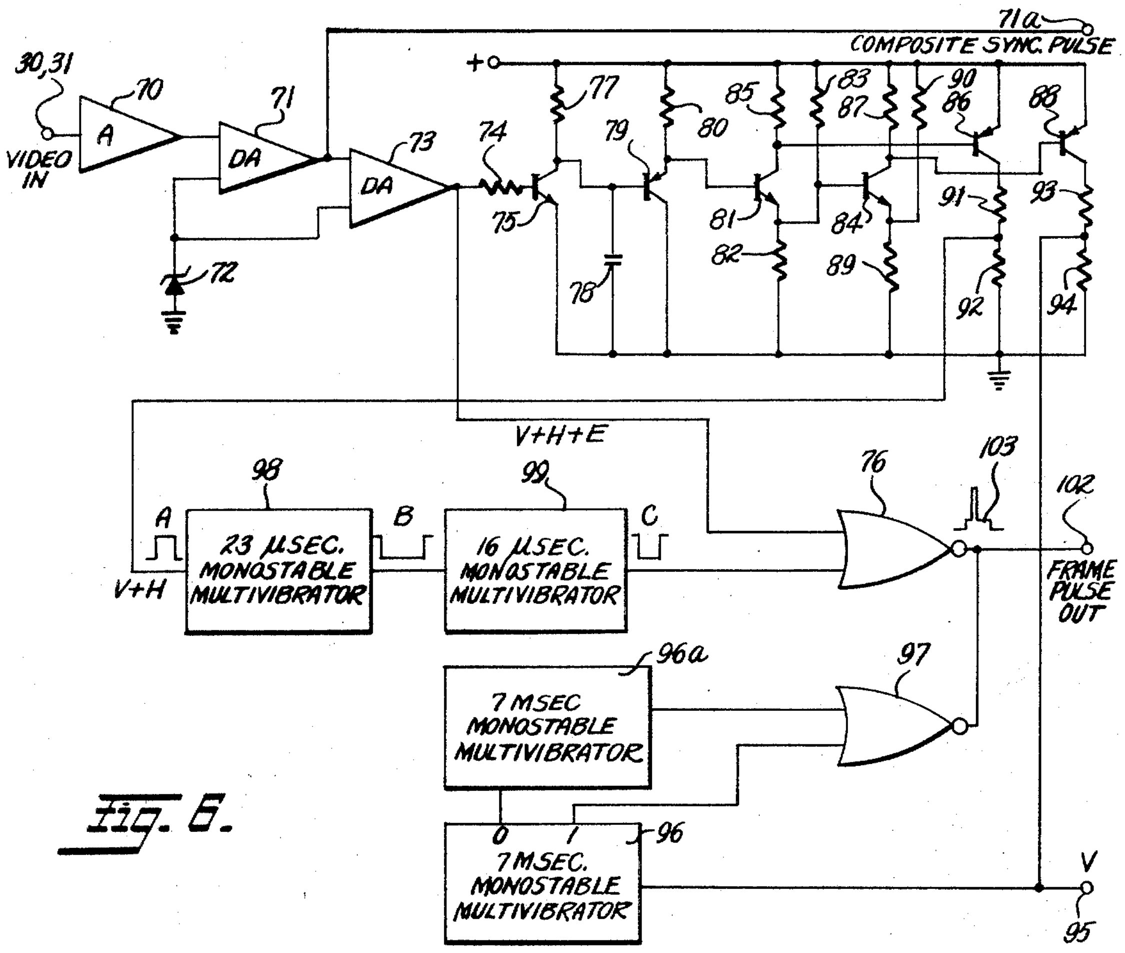
FIG. 6 is a schematic diagram of the frame detector portion of the apparatus of FIG. 3.

The manner in which the frame detector operates can be understood in greater detail by referring to FIG. 6, wherein one of the frame detector circuits is shown. It will be recognized that the frame detector circuits 15 and 17 can be identical. The video input signal, either master or remote, is coupled through the appropriate input terminal 30 or 31 to the input of an amplifier 70, the output of amplifier 70 being connected to one input terminal of a conventional transistor differential amplifier 71. The second input of differential amplifier 71 is connected to the cathode of Zener diode 72, the anode of which is connected to ground. Zener diode 72 provides a reference level with which the input signal to the other input of amplifier 71 is compared. With the full video signal provided to amplifier 70, the Zener diode allows amplifier 71 to provide no output signal until the magnitude of the input exceeds the reference level which is set at the black level shown in FIG. 1 at 2. The output of amplifier 71 is therefore the composite sync signal with the picture information and blanking pulses removed. This composite sync signal is applied through terminal 71*a* to conductors 32 or 33, as appropriate, and coupled to the audio guard unit as described with reference to FIG. 3.

The output of amplifier 71 includes small amounts of noise between the pulses constituting the composite sync signal. This output is connected to a second differential amplifier 73 which performs substantially the same operation as amplifier 71 but also shapes the pulses and eliminates some of the noise, providing a relatively clean composite sync signal consisting essentially of the vertical, horizontal and equalizing pulses. The output of amplifier 73 is connected through a fixed input resistor 74 to the base electrode of a conventional NPN transistor 75. The output of amplifier 73 is also connected to one input terminal of a conventional NOR gate circuit 76.

The emitter electrode of transistor 75 is connected to ground, and the collector electrode is connected through a fixed bias resistor 77 to a positive source of DC voltage. The collector electrode is also connected to one terminal of a fixed capacitor 78, the other terminal of which is connected to ground, and to the base electrode of a conventional PNP transistor 79. The collector of transistor 79 is connected to ground and the emitter electrode is connected through a fixed resistor 80 to the positive DC voltage source. Transistor 79 is connected as an emitter follower, the emitter electrode being connected to the base electrode of a conventional NPN transistor 81. The emitter electrode of transistor 81 is connected through a fixed resistor 82 to ground, through a fixed resistor 83 to the positive DC voltage source, and directly to the base electrode of a conventional NPN transistor 84. The collector electrode of transistor 83 is connected through a fixed bias resistor 85 to the positive DC voltage source and also directly to the base electrode of a conventional PNP transistor 86. The collector electrode of transistor 84 is connected through a bias resistor 87 to the positive DC voltage source, the collector also being connected directly to the base electrode of a conventional PNP transistor 88. The emitter electrode of transistor 84 is connected through a fixed resistor 89 to ground and through a fixed resistor 90 to the positive DC voltage source. The emitter electrodes of transistors 86 and 88 are connected directly to the positive DC voltage source, the collector electrode of transistor 86 being connected through a voltage divider circuit including fixed resistors 91 and 92 to ground. The collector electrode of transistor 88 is connected through a voltage divider including fixed resistors 93 and 94 to ground. The junction of transistors 91 and 92 constitutes one output terminal of the transistor circuit at which the vertical and horizontal pulses appear, the equalizing pulses having been eliminated. The junction of resistors 93 and 94 constitutes a second output terminal at which only the vertical pulses appear.

Figure 7:
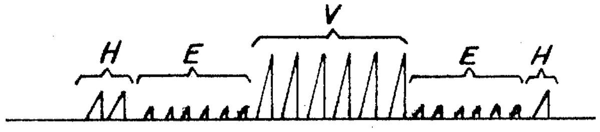
FIG. 7 is a waveform diagram showing the relative amplitude and relationship of pulses detected in the frame detector unit.

The manner in which the pulses are selectively eliminated from the composite sync signal depends largely upon the fact that the equalizing pulses are significantly shorter in duration than either of the vertical or horizontal pulses, this having been illustrated in FIGS. 4(*a*) and 4(*b*). Also, the operation of the circuit is successful because the horizontal pulses are significantly shorter in time duration than the vertical pulses. Transistor 75 and capacitor 78 form a ramp generator which has a time constant sufficiently short to prevent the equalizing pulses from charging capacitor 78 to as high a level as can be attained by the charging caused by the horizontal and vertical pulses. The signal appearing at the base electrode of transistor 79 therefore includes, for each horizontal pulse, a triangular wave the leading edge of which follows the charging characteristic of the capacitor to some intermediate level. Each equalizing pulse is able to charge the capacitor only to a very low level. The vertical pulses, however, can charge capacitor 78 to a relatively high level. This is graphically illustrated in FIG. 7. Transistor 81 is biased so that it is not responsive to the low level pulses resulting from the equalizing pulses so that only the horizontal and vertical pulses are coupled by transistor 81 to the base electrode of transistor 86 which amplifies and squares the pulses, providing this output at its collector electrode. The amplified horizontal and vertical pulse signals are developed across the voltage divider constituted by resistors 91 and 92. The output at the junction of these resistors includes the vertical and horizontal pulses at a maximum amplitude level which is suitable for connection to the following logic circuitry.

The signals appearing at the emitter electrode of transistor 81 are coupled to the base electrode of transistor 84. The emitter electrode of transistor 84 is set at a rather high level by resistor 90, a relatively small value resistor, so that transistor 84 does not respond at the level of the horizontal pulses. The horizontal pulses are therefore eliminated, the resulting vertical pulses being amplified and coupled from the collector of transistor 84 to the base electrode of transistor 88. Transistor 88 further amplifies the vertical pulses, developing the amplified signals across the voltage divider including resistors 93 and 94, the divided signal being coupled from the junction between these resistors at an appropriate level to the following logic circuit.

In the frame detector which processes the master video signals, the vertical pulses are taken from an output terminal 95 and are connected to the raster error detector 36.

The frame pulse is developed by the digital circuits including a monostable multivibrator 96 which receives the vertical pulses coupled from the junction of resistors 93 and 94. One output of multivibrator 96 is connected to one input of a NOR gate 97 and the other output is applied to the trigger input of monostable multivibrator 96*a*. The output of multivibrator 96*a* is applied to the other input of NOR gate 97, the output of which is connected to the output of NOR circuit 76. The combined vertical and horizontal pulses are connected to the input terminal of a monostable multivibrator 98, the output of which is connected to the input of a monostable multivibrator circuit 99. The output of multivibrator 99 is connected to the error input terminal of gate 76.

The vertical and horizontal pulses coupled to the input of multivibrator 98 are shown in FIG. 4(*c*), and at A in FIG. 6. Monostable multivibrator 98 is designed with a 23 microsecond delay, the output being inverted so that, at its output terminal, the level drops from a positive level to a zero or negative level, remains at the low level for 23 microseconds, and then returns to its high level, as seen at B in FIG. 6. Multivibrator 99 is responsive only to positive going pulses and therefore responds only to the trailing edge of the pulse produced by multivibrator 98. Commencing with that trailing edge, multivibrator 99 produces a negative going pulse which lasts for 16 microseconds, as seen at C in FIG. 6, this pulse being produced in response to each positive pulse provided at the input to multivibrator 98. A plurality of such pulses are shown in FIG. 4(*d*), the first one being in response to the last horizontal pulse of FIG. 4(*c*), the next six being in response to the six vertical pulses, and the remaining ones illustrated being in response to the horizontal pulses, these all being included in the input to multivibrator 98. The particular one of these pulses which is of interest is pulse 100 (FIG. 4(*d*)), the one which occurs as a result of the last horizontal pulse and which is spaced from the leading and trailing edges of that horizontal pulse. It will be observed that the particular delays designed into multivibrators 98 and 99 cause pulse 100 to bracket the time period in which the first equalizing pulse 101 of the second field exists, as seen in FIG. 4(*b*). It will be recalled that pulse 101 is unique in one frame of composite sync pulses in that no similar pulse exists during the series of sync pulses of the first field.

It will further be recognized that the output of multivibrator 99 normally exists at a high level (binary 1) at which gate 76 is blocked so that none of the composite sync signal pulses from amplifier 73 can pass to the output terminal of gate 76. However, when the output of multivibrator 99 drops to a low level (binary 0), it is possible for gate 76 to conduct during the relatively short pulse span of each of the pulses such as pulse 100.

It will be recognized that, for proper synchronization, only pulse 101 of all of the pulses provided from the output of amplifier 73 can be allowed to pass. None of the pulses produced by multivibrator 99 other than pulse 100 can be permitted to have the opening effect on gate 76 that characterized pulse 100. The blocking operation is performed by the circuit including monostable multivibrators 96 and **96*a* and NOR gate 97. The first vertical pulse of the pulses connected to the input terminal of multivibrator 96 causes it to change state, raising the level of its 1 output to a high state (binary 1), which is in turn applied to the input of NOR gate 97. The 0 output, a low level (binary 0) output, is applied to the trigger input of multivibrator 96*a*. As previously described in discussing multivibrators 98 and 99, multivibrator 96*a* will only be triggered by a positive going pulse and therefore will not toggle when multivibrator 96 is triggered. The high level (binary 1) applied to the input of NOR gate 97 will produce a low level (binary 0) output from gate 97 and will clamp the output of NOR gate 76 that characterizes pulse 100. The blocking operation pulses to pass during that period. The unstable state of multivibrator 96 is relatively long, being 7 milliseconds. When multivibrator 96 returns to its stable state, its 0 output rises to a high level (binary 1) and triggers multivibrator 96*a*, whose high level (binary 1) output is applied to the other input to NOR gate 97. This high level (binary 1) input produces a low level (binary 0) output from NOR gate 97 which clamps the output of NOR gate 76 as previously described. The unstable state of multivibrator 96*a*** is also 7 milliseconds. Thus, 14 milliseconds after the first vertical pulse in FIG. 4(*c*), the multivibrator **96*a* returns to its stable state, leaving approximately a 2.6 millisecond span during which gate 76 can pass pulses if the second condition, that of a low level (binary 0) output from multivibrator 99, is also fulfilled during this time period. It will be recognized that only pulse 100 permits these two conditions to exist simultaneously so that only pulse 101 can be provided at the output of gate 76 and conducted to output terminal 102**.

From the foregoing description, it will be seen that the apparatus shown and described in FIG. 6 constitutes an effective device for selecting, from the many pulses appearing in the video signal, one pulse which is unique in being the first pulse of a selected set. The pulse appears actually to ride on a pedestal 103, as seen in FIG. 6D, which constitutes the relatively low potential of the vertical pulse passing through gate 97. The resulting pulse and its time relationship to the remaining pulses is shown in FIG. 4(*f*), assuming that the sequence has occurred in the master frame detector.

FIG. 4(*g*) shows a frame pulse which might be produced by the remote frame detector in the same manner as described with reference to FIG. 6. It has been assumed that the remote pulses lag the master pulses by roughly 90 microseconds, this span of time having been designated the raster error. The frame pulses from the master and remote frame detectors therefore appear in their assumed relationship in FIGS. 4(*f*) and 4(*g*). These pulses are coupled to the raster error detector 36.

Figures 8, 11, 13:
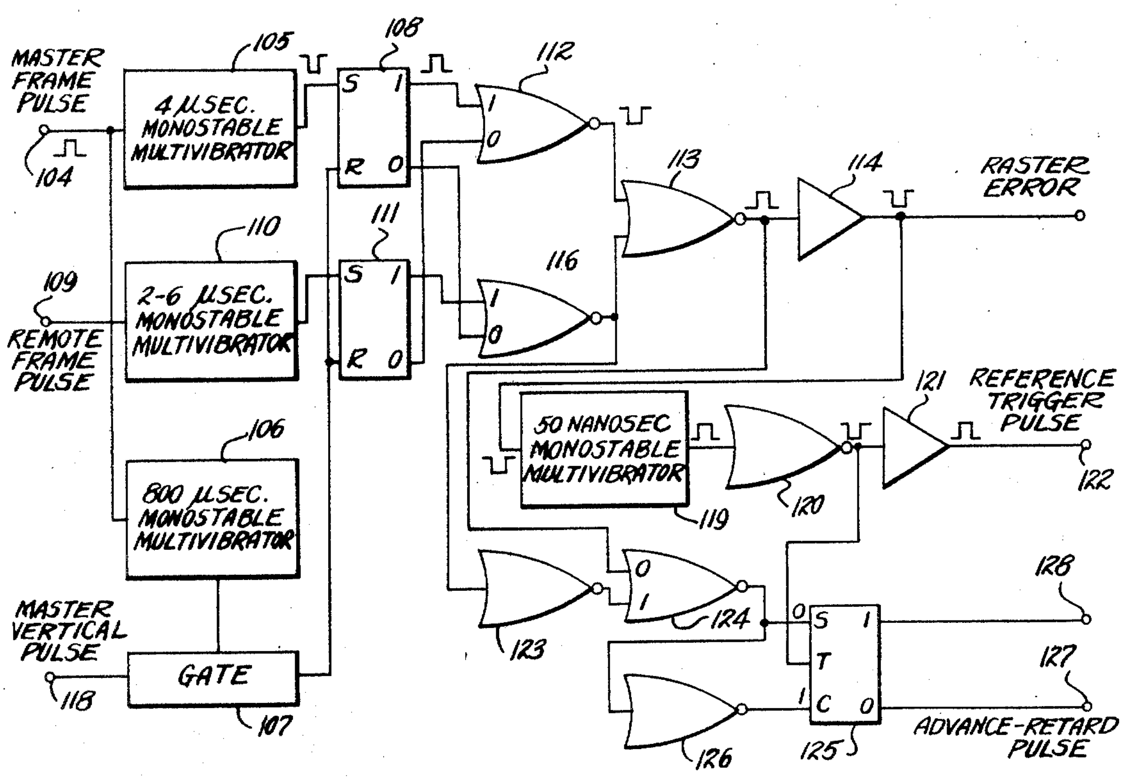
FIG. 8 is a schematic diagram of a raster error detector usable in the apparatus of FIG. 3.
FIG. 11 is a logic table showing one format of error signal which can be generated by the apparatus of FIGS. 8–10.
FIG. 13 is a logic table showing a format for receiver decoding in the apparatus of FIG. 3.

The master frame pulse shown in FIG. 4(*f*) is applied via terminal 104 to the inputs of monostable multivibrators 105 and 106 in raster error detector 36, as seen in FIG. 8. The output of multivibrator 105 is applied to the set (S) input of bistable multivibrator 108. The remote frame pulse from frame detector 17 is applied through terminal 109 to the input of monostable multivibrator 110. The output of monostable multivibrator 110 is applied to the set (S) input of bistable multivibrator 111. Assuming that the master frame pulse, as shown in FIG. 4(*f*) leads the remote frame pulse, as shown in FIG. 4(*g*), the master frame pulse will be applied to raster error detector 36 first in time. The output of bistable multivibrator 108 will be applied to one input of NOR gate 112, the output of that circuit being applied as an input to NOR gate 113. The output of NOR gate 113 is applied to amplifier-inverter 114 and creates the leading edge 115 of the raster error pulse shown in FIG. 4(*h*). With the remote frame pulse, FIG. 4(*g*), lagging the master frame pulse, FIG. 4(*f*), monostable multivibrator 110 will be triggered a period of time equal to the raster error after monostable multivibrator 105. The output of multivibrator 110 is applied to the set (S) input of bistable multivibrator 111. The output of bistable multivibrator 111 is applied to one input of NOR gate 116, the output of which is applied to the other input of NOR gate 113. With two high level (binary 1) inputs applied to NOR gate 113, the output of gate 113 goes to a low level (binary 0) and creates the trailing edge 117 of the raster error pulse shown in FIG. 4(*h*). Monostable multivibrator 106 is triggered by the master frame pulse and its output is applied to gate 107. The master vertical pulse train from master frame detector 15 is applied through terminal 118 of raster error detector 36 to the other input of gate 107. Monostable multivibrator 106 triggers for a period of 800 microseconds, inhibiting the master vertical pulses by blocking gate 107. The gated master vertical pulse output of gate 107 is applied to the reset (R) inputs of bistable multivibrators 108 and 111, to reset them to their original condition. The purpose of the 800 microsecond delay in gating the master vertical pulses to reset bistable multivibrators 108 and 111 can be readily seen with reference to FIG. 4. The 800 microsecond delay created by monostable multivibrator 106 will effectively block out vertical pulses in the second field, as shown in FIG. 4(*c*), and prevent them from resetting bistable multivibrators 108 and 111, since the phase lag of the frame pulse from the remote frame pulse detector 17 may be greater than the interval between the last horizontal sync pulse and the first vertical pulse of the second field. The master vertical pulses are blocked out to allow the remote frame pulse to be applied to raster error detector 36 before bistable multivibrators 108 and 111 are reset to their original condition. Therefore, the first vertical pulse from the vertical pulse train in the first field will reset bistable multivibrators 108 and 111. With bistable multivibrators 108 and 111 reset, they are in the proper condition to receive the next series of master and remote frame pulses from monostable multivibrators 105 and 110.

Figure 5:
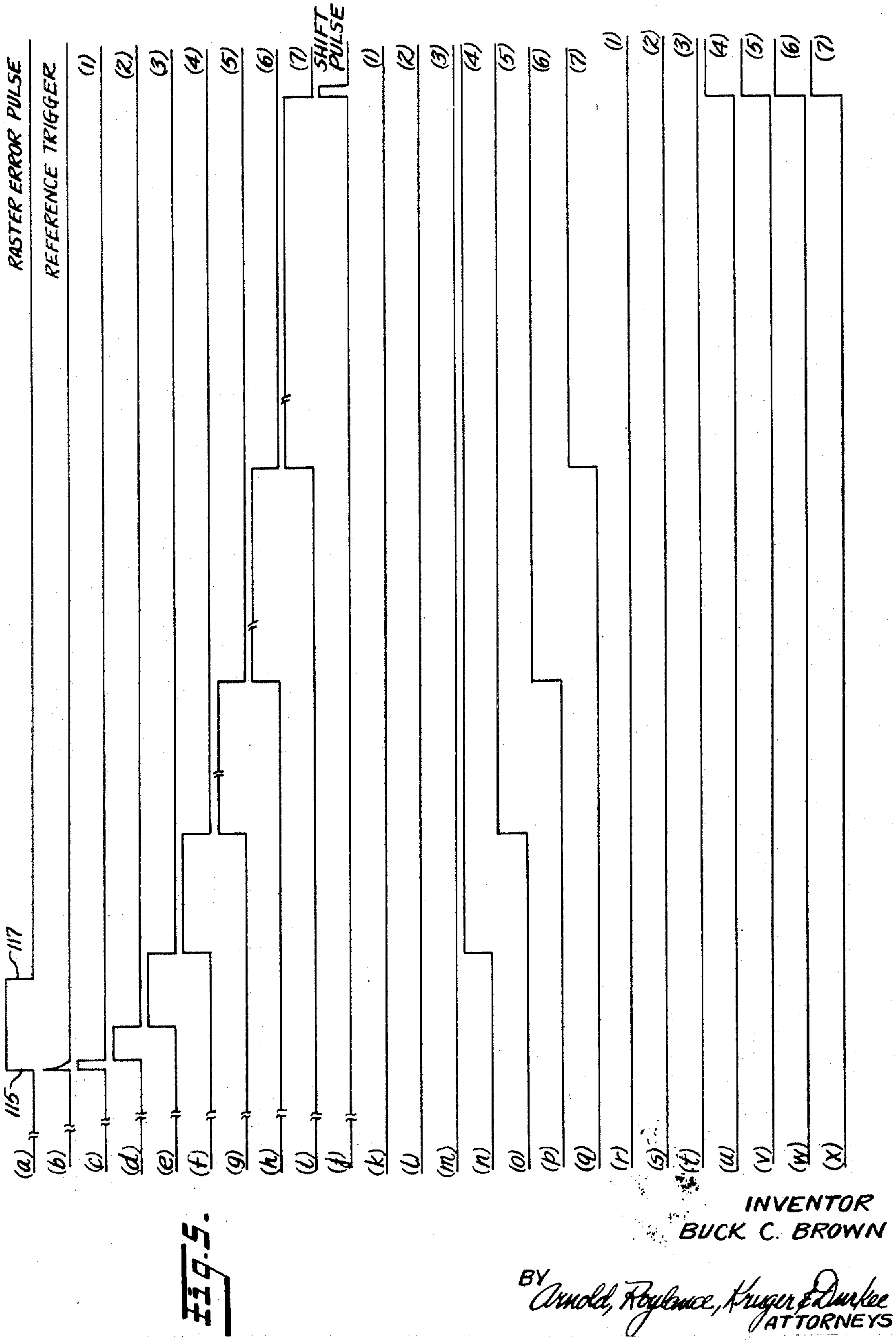

The leading edge 115 of the raster error pulse, FIG. 5(*a*) appears at the output of inverting amplifier 114 and is also applied as an input to monostable multivibrator 119. The output of multivibrator 119 is applied as an input to inverter 120, the output of which is in turn coupled to the input of inverting amplifier 121. The output of inverting amplifier 121 is the reference trigger pulse, seen in FIG. 5(*b*). Monostable multivibrator 119 remains in its unstable state for 50 nanoseconds and then reverts to its original stable state, thus giving the reference trigger pulse a maximum pulse width of 50 nanoseconds. Note in FIG. 5 that the leading edge of the reference trigger pulse coincides with the leading edge of the raster error pulse. The reference trigger pulse is applied through terminal 122 of raster error detector 36 to the input of time gate generator 42. The output of inverting OR gate 116 is also applied to the input of an inverter circuit 123 the output of which is applied to one input of NOR gate 124. The output of NOR gate 113 is also applied to the other input of NOR gate 124.

Once the leading edge of a raster error pulse has been gated through NOR gate 113, whether it is caused by a master or remote frame pulse, the output of gate 113, applied to one input of NOR gate 124, will remain at the same level. However, the output of inverter 123 will vary, depending on the output of NOR gate 116.

If the remote frame pulse is lagging in phase, as illustrated in FIGS. 4(*f*) and 4(*g*), the input of NOR circuit 124 from inverter 123 will be in the opposite relation to the other input of NOR gate 124, causing a high level (binary 1) input to be applied to the set (S) input of bistable multivibrator 125. The output of gate 124 is also inverted by inverter 126 and applied as a low level (binary 0) input to bistable multivibrator 125 at input C. The triggering input to bistable multivibrator 125 is the reference trigger pulse output from inverter 120. When triggered, bistable multivibrator 125 produces a positive going advance pulse applied through terminal 127 to the fourth gated audio oscillator 48.

If the remote frame pulse leads the master frame pulse, both inputs to NOR gate 124 will be at a low level (binary 0). The output of gate 124 will be a high level output (binary 1) applied as a set (S) input to bistable multivibrator 125 and an inverted low level input to the clear (C) input of multivibrator 125. When triggered by the reference trigger pulse output of inverter 120, bistable multivibrator 125 will produce a positive going retard pulse applied through terminal 128 to the fourth gated audio oscillator 48.

Figure 9:
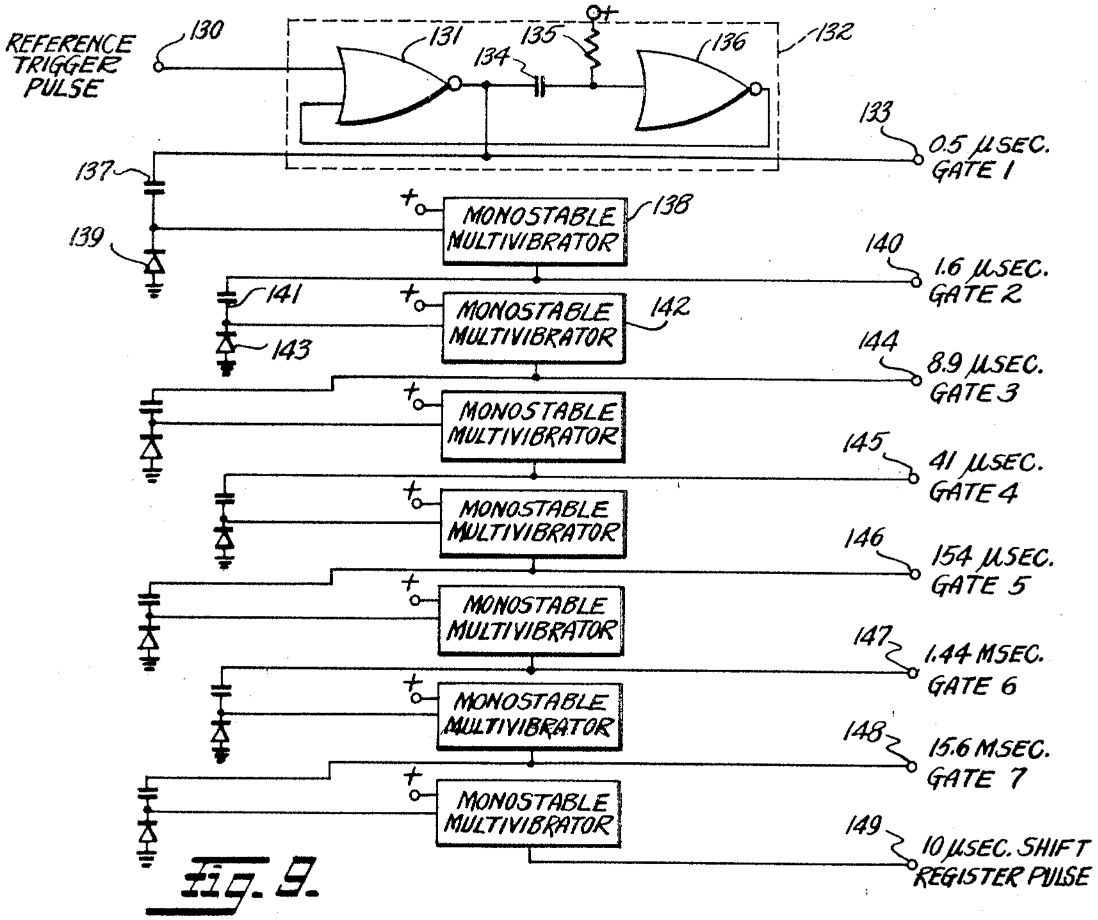
FIG. 9 is a schematic diagram of a time gate generator usable in the apparatus of FIG. 3.

Time gate generator 42 is shown in greater detail in FIG. 9. The reference trigger pulse from raster error detector 36 is applied through terminal 130 to the input of a NOR circuit 131 of monostable multivibrator circuit 132. The output of NOR circuit 131 is applied to terminal 133 as the first gated pulse output, as shown in FIG. 5(*c*), to be applied to error register 40. The RC time constant of capacitor 134 and resistor 135 determines the duration of the first gated output pulse before multivibrator 132 is triggered back to its stable state. Inverter 136 maintains the proper input level to the other input of NOR circuit 131. The output of monostable multivibrator 132 is also applied through capacitor 137 to the input of monostable multivibrator 138 and the cathode of diode 139. Diode 139 serves to clamp the input of monostable multivibrator 138 during the negative going portion of the first gated output pulse of multivibrator 123, but allowing the positive going trailing edge to trigger multivibrator 138. The pulse width of the second gated pulse is 1.6 microseconds as determined by the unstable period of multivibrator 138. The output of multivibrator 138 is applied through terminal 140 as the second gated pulse output, seen in FIG. 4(*d*), to be supplied to the error register 40.

The output of multivibrator 138 is also applied through capacitor 141 to monostable multivibrator 142. Diode 143 performs the same function described above for diode 139. When multivibrator 142 is triggered, its output is applied through terminal 144 as the third gated pulse output, seen in FIG. 4(*e*), with a pulse width of 8.9 microseconds.

The output of multivibrator 142 is applied to the input of the next monostable multivibrator. The five remaining monostable multivibrators function in identical fashion as those just described. The only difference between the various remaining cascaded monostable multivibrators is the RC time constants that determine their relaxation time and the pulse width of their respective gated pulse outputs. The outputs of the next four stages provide gated pulse outputs through terminals 145–148 of 41, and 154 microseconds, and 1.44, and 15.6 milliseconds, respectively, as shown in FIGS. 4(*f*)–4(*i*). The eighth stage provides a shift register pulse of 10 microseconds duration applied through terminal 149 to error encoder 43.

Figure 10:
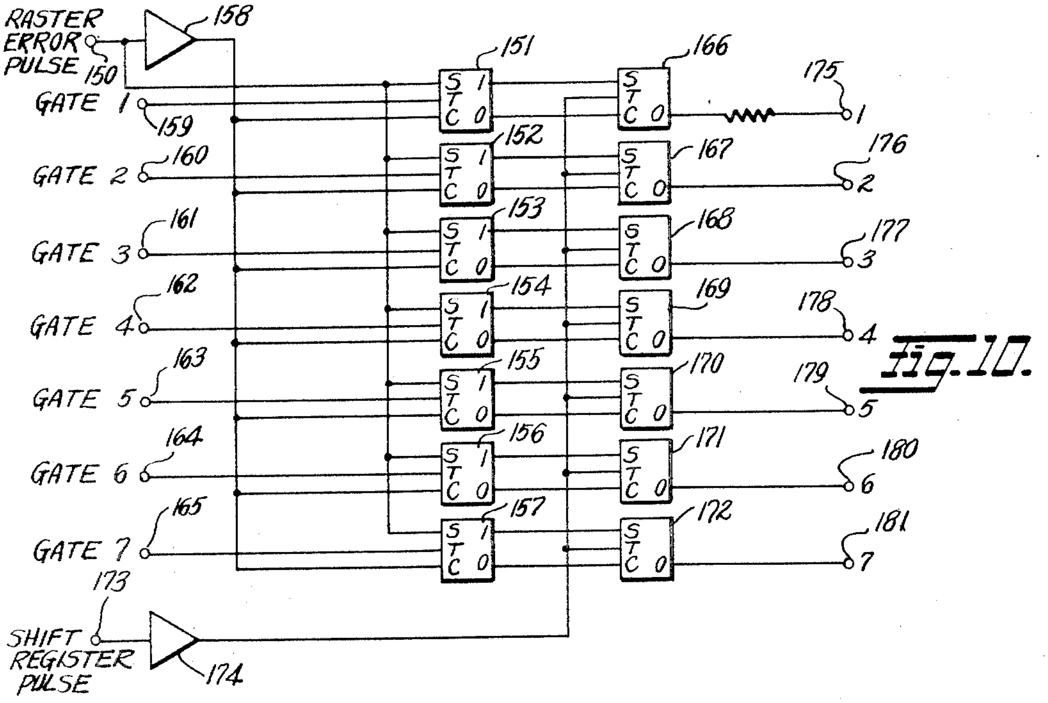
FIG. 10 is a schematic diagram of an error register unit usable with the apparatus of FIG. 3.

FIG. 10 illustrates error register 40 in more detail. The raster error pulse generated by raster error detector 36 is applied through terminal 150 to the S inputs of bistable multivibrators 151–157. The raster error pulse is also applied as an input to inverting amplifier 158, the output of which is applied to the C inputs of bistable multivibrators 151–157, therefore setting the inputs of all of multivibrators 151–157 to the same state. The gated pulses from time rate generator 42 are applied through terminals 159–165 of error register 40 to the trigger inputs of bistable multivibrators 151–157, respectively. Assuming that the 1 and 0 outputs of multivibrators 151–157 are at a high level (binary 1) and a low level (binary 0), respectively, it will be seen, referring to FIG. 4, that the first gated time rate generator pulse, FIG. 5(*c*), applied to the T input of multivibrator 151 will not trigger multivibrator 151, since the output levels are respectively at the same levels as the inputs. This maintains a high level (binary 1) input to S of multivibrator 166 and a low level (binary 0) input to C of multivibrator 166. This appears in FIG. 5(*k*) as no change in level at the 0 output of multivibrator 151. Similarly, when the second gated time rate generator pulse, FIG. 5(*d*), is applied to the T input of multivibrator 152, no triggering action takes place for the same reason given for multivibrator 151.

Assuming the raster error pulse applied to terminal 150 has the pulse duration shown in FIG. 5(*a*), it will be seen that the trailing edge of the raster error pulse will occur during the third gated time generator pulse interval. As in the case of multivibrators 151 and 152, when the third gated time rate generator pulse, FIG. 5(*e*), is applied to the T input of multivibrator 153, no triggering action takes place. However, when the fourth time rate generator pulse, FIG. 5(*f*), is applied through terminal 162 to multivibrator 154, the raster error pulse will have terminated and the S inputs of multivibrators 151–157 will be reset to a low level (binary 0) and the C inputs will be set to a high level (binary 1). When triggered by gated time generator pulses 4–7 through terminals 162–165, FIGS. 5(*f*)–5(*i*), the low (binary 0) and high (binary 1) levels will be applied, respectively, to the S and C inputs of multivibrators 168–172, FIGS. 5(*n*)–5(*q*).

The shift register pulse is applied through terminal 173 of error register 40 to the input of amplifier-inverter 174, the output of which is applied as the T input of multivibrators 166–172. Multivibrators 166–172 function as a typical shift register final stage and "shift" out of the 0 inputs the input level applied to the C inputs, respectively. Referring to FIGS. 5(*r*)–5(*x*), it will be seen that seven gated error outputs will be supplied at terminals 175–181, to be applied as inputs to the error encoder 43, as shown in FIG. 3.

The error encoder is a seven by three matrix having seven binary inputs, the combinations of which provide three binary bit coded outputs. Encoder (seven by three matrix) 43 can be any conventional logic circuit capable of performing this conversion and will not be described in detail. From the truth table for the encoder matrix, FIG. 11, it will be seen that, for seven successive combinations of gated error outputs from error register 40, differing three-bit words having bits A, B, and C can be formed.

Figure 12:
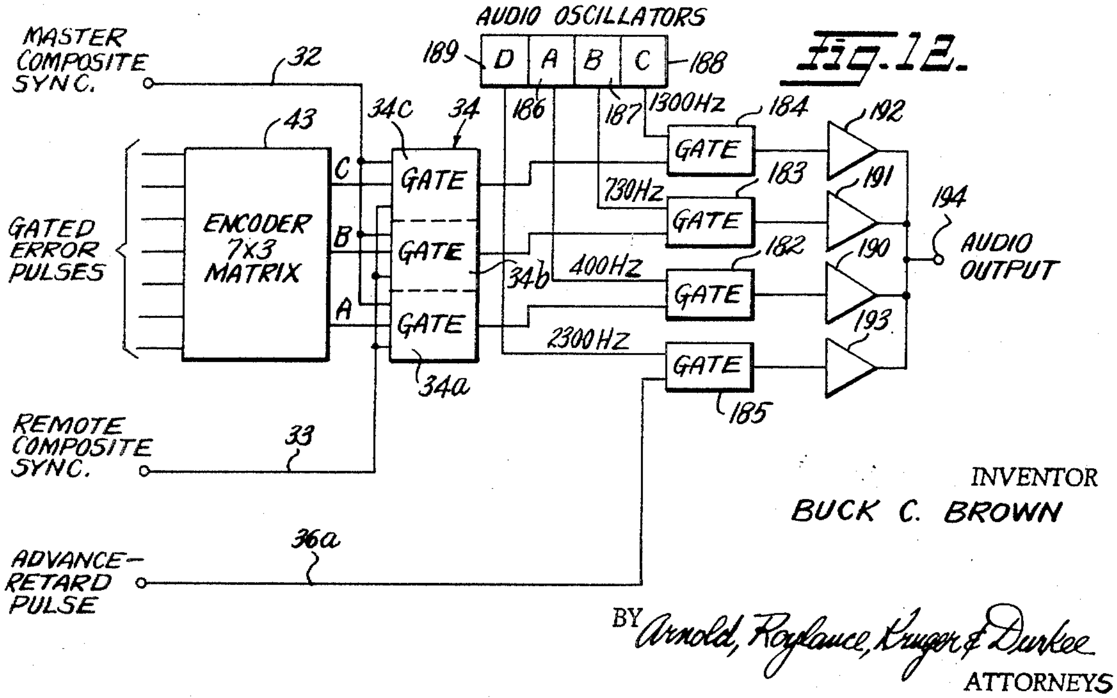
FIG. 12 is a schematic diagram of the coding and audio signal output circuitry of the transmitter portion of the apparatus of FIG. 3.

Referring now to FIG. 12, it will be seen that the three-bit words, representing bits A, B, and C from encoder matrix 43 are applied to one input of conventional resistor-transistor logic gates 34*a*–34*c* of audio guard unit 34. Master composite sync pulses from master frame detector 15 are applied through conductor 32 to a second input of gates 34*a*–34*c*. The remote composite sync pulses from remote frame detector 17 are applied through conductor 33 to a third input of gates 34*a*–34*c*. As long as there are composite sync signals on conductors 32 and 33 from the frame detectors 15 and 17, the three encoded bits will be gated through audio guard unit 34 and applied substantially unmodified to gates 182–184. Audio guard unit 34 should include some integration in its input circuits so that the temporary absence of sync pulses (as between pulses, for example) will not cause loss of the correction signals. The advance-retard pulse applied through conductor 36*a* from raster error detector 36 is applied as one input to gate 185.

Audio oscillators 186–189 can be of any conventional design. The frequencies chosen for the described embodiment were 400, 730, 1300 and 2300 Hz. for audio tones A, B, C, and D, respectively. Audio oscillators 186–189 are continuously running and have their outputs applied to the other inputs of gates 182–185, respectively. If the inputs to gates 182–185, containing one of the bits of the three-bit word from the audio guard unit or the advance-retard pulse, includes a low level (binary 0) signal, the audio oscillator output applied to that gate will be passed to one of conventional line amplifiers 190–193, as shown in FIG. 12. It will be seen that audio tone D will be gated through gate 185 to line amplifier 193 so long as an advance pulse exists, the absence of the pulse indicating retard. The audio tones A, B, and C are amplified and coupled through terminal 194 to an audio range transmission line 21, as shown in FIG. 3. Typically, conversation quality telephone transmission line can be employed. Such transmission line generally has a frequency range from approximately 400 to 2400 Hz.

At the remote video program source, the audio frequency signals from the transmission line 21 are applied to four audio frequency detectors 51–54, as seen in FIG. 3, and previously discussed. The three-bit word output from detectors A, B, and C is coupled into a decoder matrix circuit 56. The truth table for the seven by three matrix of circuit 56 is seen in FIG. 13. The matrix is a conventional logic circuit capable of accepting three inputs and converting these into one of seven gated decoder output code pulses applied to one group of inputs to time rate control unit 57. As previously discussed, rate oscillator 58 applies a single preselected frequency to time rate generator unit 59, which in turn divides the rate oscillator frequency by six factors and applies the divider frequencies to another group of inputs to time rate control unit 57. The seven frequencies applied to time rate control unit 57 are seven rate frequency signals ranging from 7.2 Hz. to 230 kHz. and corresponding to one of the seven gated decoder output code pulses from decoder matrix 56, as seen in FIG. 13.

Figure 14:
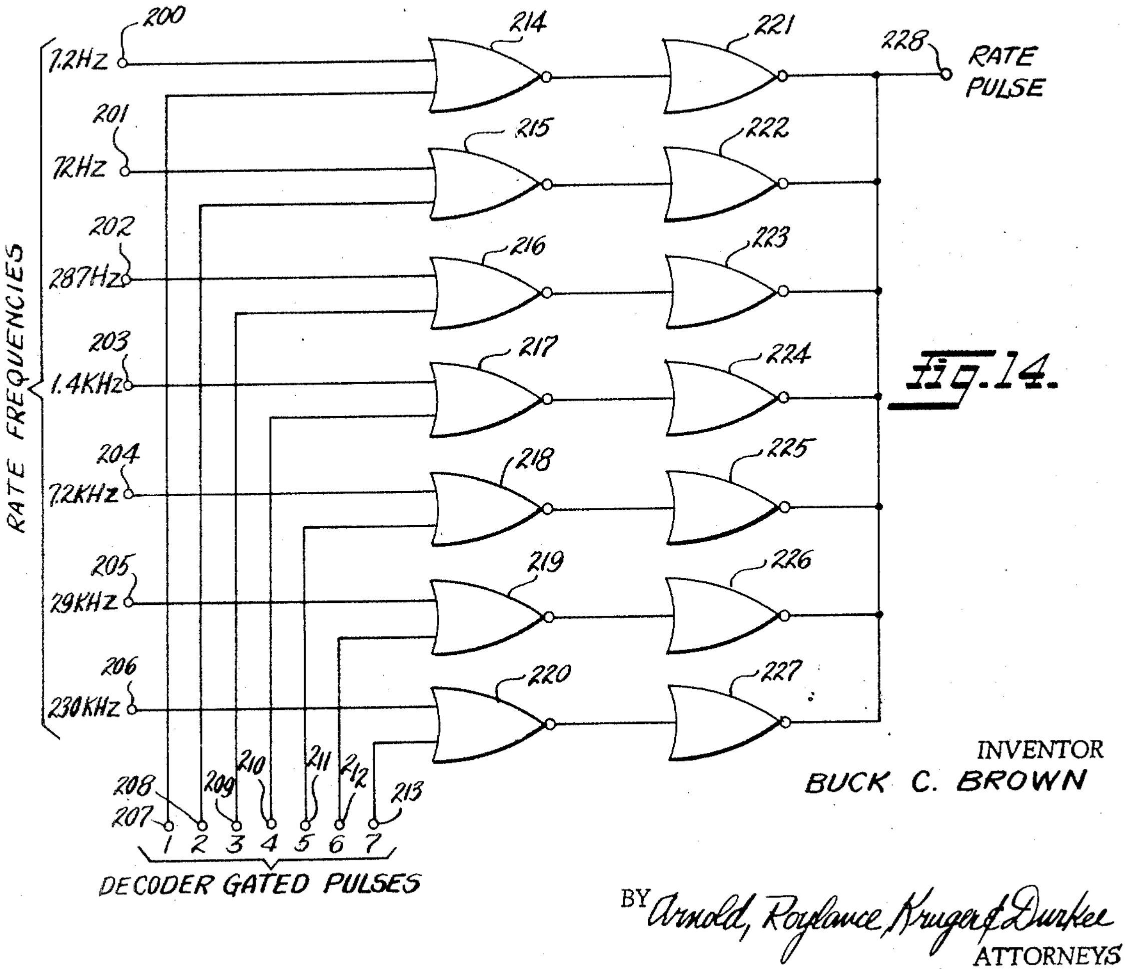
FIG. 14 is a schematic diagram of a time rate control unit usable in the apparatus of FIG. 3.

FIG. 14 shows a time rate control circuit that is employed in this embodiment of the invention. The seven rate frequencies from time rate generator 59 are applied as inputs via terminals 200–206 and the seven possible decoder gated pulses from decoder matrix 56 are applied as inputs via terminals 207–213. Each corresponding pair of rate frequencies and decoder gated pulses are applied to the inputs of NOR gates 214–220, respectively. The rate frequencies always appear at the inputs to NOR gates 214–220, but only one of the seven decoder gated pulses appears at the other inputs to NOR gates 214–220 as determined by the truth table, FIG. 13, governing the matrix of decoder 56. The rate frequency appearing at one input to NOR gates 214–220 will be gated through to the inputs of amplifier-inverters 221–227 if its associated decoder gate pulse also is present on the other input to gates 214–220. The amplified inverted outputs of inverters 221–227 are coupled to terminal 228 and become the rate pulse output applied to time shift unit 60.

Figure 15:
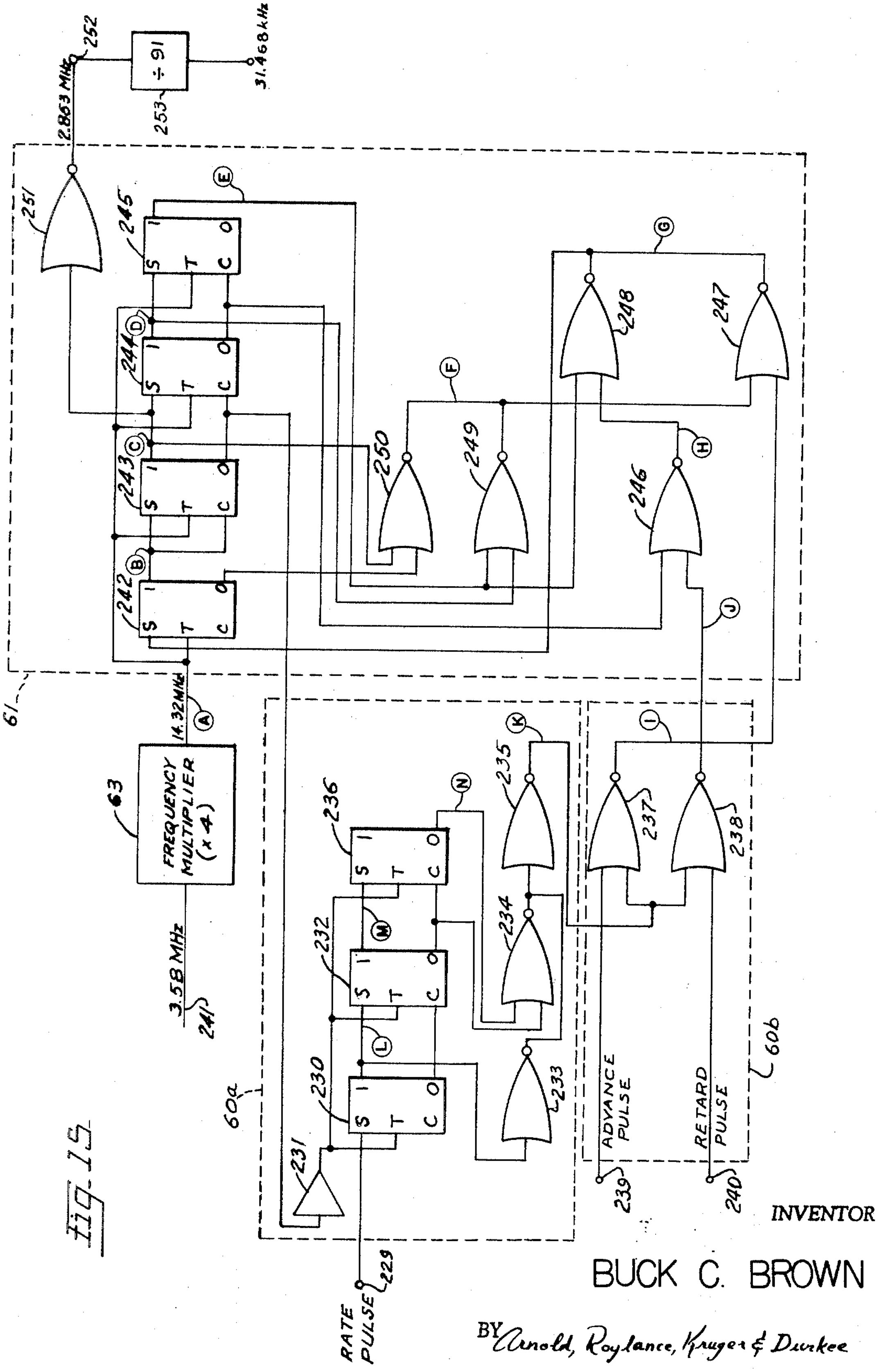
FIG. 15 is a schematic diagram of a time shift unit usable in the apparatus of FIG. 3.

FIG. 15 shows the time shift unit 60, the 3.58 mHz. multiplier 63 and the dividers 61 and 253 to achieve the 31,468 kHz. signal shown in FIG. 3. The rate pulses are applied via terminal 229 to the SET input of bistable multivibrator 230 of time shift unit 60. Unit 60 includes two portions, identified as 60*a* and 60*b*, the apparatus in unit 60*a* including means for controlling the point in a division cycle at which a new denominator is selected. The apparatus in unit 60*b* provides signals which control the selection of one of two possible denominators other than the denominator by which unit 61 normally divides. The frequency divider, unit 61, includes binary circuits and appropriate gated feedback loops to control the division ratio, this ratio being normally 5 but selectably 4 or 6, depending upon the control signals from unit 60*b*

Figure 16:
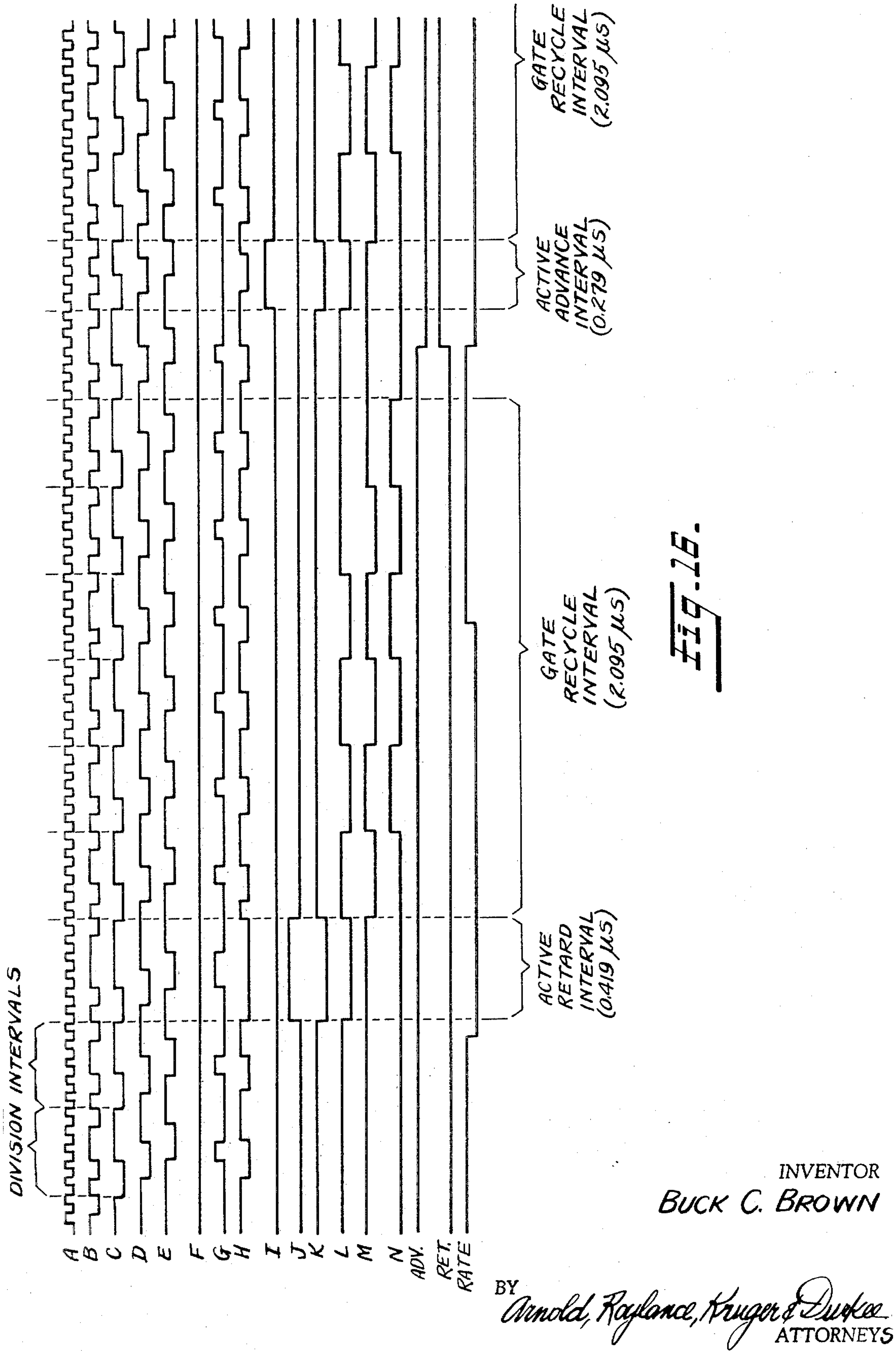
FIG. 16 is a waveform diagram showing the time relationship of pulses occurring in the time shift unit of FIG. 15.

The operation of the apparatus of FIG. 15 can be best understood by referring to the timing diagram of FIG. 16. The various waveforms shown in FIG. 16 are those which occur at the points in FIG. 15 identified by the circled letters. The advance signal is that which is applied at terminal 239 in FIG. 15 and the retard signal at 240, the rate signal being that applied to terminal 229. As previously discussed, the 3.58 mHz. signal is multiplied by four in unit 63, the resulting 14.32 mHz. signal being coupled into unit 61 for division by one of the three factors. The divided signal, normally at a frequency of 2.863 mHz., appears at an output terminal 252 and is subsequently divided by ninety-one to produce a 31.468 kHz. signal to drive the sync generator.

Unit 60*a* includes an inverting amplifier 231 and three cascaded bistable circuits 230, 232, and 236. Three NOR gate circuits 233, 234, and 235 are coupled to the outputs of the bistable circuits and provide a signal to gate circuits 237 and 238 in unit 60*b*. The output of unit 60*b*, either an advance or retard signal, is coupled to gate circuits 246 and 247 in divider 61, gate circuits 246 and 247 forming a portion of the feedback network for the divider circuit. Gate circuits 248, 249, and 250 complete the feedback gate circuits for the divider. The divider itself includes bistable circuits 242, 243, 244 and 245, the output being inverted by a gate circuit 251.

The function of unit 60*a* is to sense the completion of a division cycle within the divider unit and, at the completion a division cycle within the divider unit and, at the completion of a cycle, to respond to the existence of a rate pulse at input terminal 229 to provide an enabling signal to unit 60*b*. Normally, the signal identified at K is a blocking signal which prevents either the advance or retard signals from passing through gate circuits 237 or 238. When the signal at K is changed to an enabling signal, the advance or retard signals are allowed to pass to the inputs of NOR gates 246 or 247 to alter the division cycle.

The basic divider circuit with its feedback loops capable of dividing by five is shown in FIG. 17. It will be recognized that in FIG. 17 the inputs from unit 60*b* have been assumed to be zero and are not shown. Thus, the divider circuit is a bistable division apparatus with feedback loops to establish the denominator at 5 so that one output pulse will appear for each five input pulses.

In unit 60*a*, the input to inverting amplifier 231 is conneted to the zero output of bistable circuit 243 which necessarily is the inverse of the output signal appearing at point C. Thus, the output of amplifier 231 is the same as the signal at point C, this output being applied to the toggle inputs of each of bistable circuits 230, 232, and 236. With the rate input signal at a "1" level, bistable circuit 230 assumes its SET state, producing an output at the "1" level, as shown in FIG. 16, waveform L. It will be recognized that "zero equals true" at input terminal 229, so that when the rate signal drops to zero the output of amplifier 231 causes bistable circuit 230 to change state. The signal at L therefore also changes state, allowing the next negative-going signal from amplifier 231 to cause bistable circuit 232 to change state, as shown in FIG. 16, waveform M. At the next output from amplifier 231, bistable circuit 236 changes state, its output going to a "1" level, as shown in FIG. 16, waveform N. During the time when L is "0," M is at "1," and N is at "0," the input to gate circuit 233 is at "0," as are the inputs to gate circuit 234, allowing a "1" input at gate 235 and producing a "0" output, as shown in FIG. 16K. This set of circumstances signals the completion of a division cycle within unit 61 and provides an enabling signal for gate circuits 237 and 238. Assuming, as shown in the first portion of FIG. 16, that a retard signal is present (terminal 240 at "0" level), a "1" output appears at J and a "0" output remains on I. The J output is connected to gate circuit 246, causing the output of circuit 246 to go to "0" and remain at that level during the period of one division cycle, essentially blocking that gate from performing its usual function in the feedback loop. The net result is to provide an additional feedback loop through gate circuit 248, this loop acting as an inversion loop between the output of bistable circuit 245 and the set input of bistable circuit 242. This alters the division ratio, for one division cycle, so that the divider now divides by six, producing an output as seen in FIG. 16C in which the second portion of the cycle is extended. This essentially delays the next cycle, and all subsequent cycles, by a time equal to one cycle of the 14.32 mHz. input signal which is equal to about 70 nanoseconds. A similar analysis of the operation during the active advance interval of FIG. 16 will show that the output signal is decreased by approximately 70 nanoseconds, the divider dividing by four during the one division cycle. In the latter case, the output pulse train is advanced in time by 70 nanoseconds.

The operation of the apparatus of FIG. 17 can be more easily understood by first considering the operation of the gate circuits 247, 249, and 250. The input signals to NOR gates 249 and 250 are the signals shown at FIGS. 16C, D and E and the inverse of the waveform at FIG. 16D. A typical circuit showing the internal details of each of the gate circuits is shown in FIG. 19 with its accompanying truth table in FIG. 20 demonstrating that if a "1" input exists at either terminal of either gate circuit, a "0" must exist at its output. It will be further evident that if a "0" exists at the output of either gate circuit 249 or 250, a "1" at the output of the other gate circuit will be of no effect, the "0" being the overriding function. From this it will be apparent that the signal at F will remain at "0" unless all of the inputs to gate circuits 249 and 250 are simultaneously "0." This situation never exists in normal operation, as can be seen from an examination of the waveforms in FIGS. 16B, C, D, and E. Thus the inverse of F at the output of gate circuit 247 performs the task of a guard function, insuring proper initial condition at the input to the gate circuit 242. It will be recognized that the waveform shown at FIG. 16G will be a composite of the outputs of gate circuits 247 and 248, the output of gate 248 being the overriding function because when that output goes to "0" the one output of gate 247 will be of no effect. Thus, in the analysis of the apparatus, gates 249, 250 and 247 can be ignored.

Although the timing diagram of FIG. 16 is complete and contains all of the necessary information, it is helpful to consider the portion of the timing diagram which relates only to the bistable circuits 242–245 and gate circuits 246 and 248 to understand the normal division-by-five sequence of events. This portion of the timing diagram is reproduced in enlarged form in FIG. 21, wherein the letters again identify the portions of the circuit of FIG. 17 in which these waveforms appear. A single division interval has been isolated, this interval including five input cycles at A and one output cycle at C. The A input to bistable circuit 242 is normally divided by two by bistable circuit 242, as can be seen in FIG. 20B, the first two cycles of A being needed to produce one full cycle of B. A simple division by two would also occur in bistable circuit 243 if the feedback loop including gate circuits 246 and 248 were not present, in which case a division by four would occur between points A and C. However, at the termination of the second pulse in the division interval, the existence of a "0" level at E and a "0" level at H produces a "1" level at G, which biases bistable circuit 242 by providing a "1" level at its SET input terminal. This prevents bistable circuit 242 from reverting to its RESET state at the end of the third pulse in the division interval, as it would normally do, thereby delaying the resetting for one additional cycle of the input signal. Resetting of bistable circuit 243 is therefore also delayed by one cycle from the end of the fourth pulse to the end of the fifth pulse, thereby producing division by five rather than by four. A step-by-step analysis of the timing diagram of FIG. 20 reveals that, if no external signals are provided to the apparatus of FIG. 17, a division by five will continuously occur.

A similar delayed reset effect is produced by the presence of a retard signal at J in FIG. 15, the effect of that additional signal being to lengthen the one level pulse provided at G to the set input of bistable circuit 242, delaying the reset action for a time equivalent to two input pulses rather than just one.

The operation of the advance signal can also be understood in this light, the result of a signal appearing at I being effective to produce a "0" at the output of gate circuit 247 and prevent any delaying pulse from appearing at G. The net effect of this signal is to eliminate gate circuits 246 and 248 from the apparatus of FIG. 17 for one division cycle, allowing the bistable circuits to divide by four as if no feedback were present.

Figure 18:
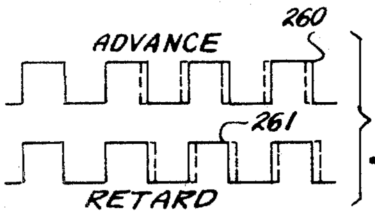
FIG. 18 is a waveform diagram of the corrected remote video pulses.

Again, it should be emphasized that the advance and retard signals, causing a divide-by-four or divide-by-six action, exist only for one division cycle and do not change the actual frequency of the output signal. Instead, the pulses are merely moved ahead or back in time, as shown in FIG. 18.

The significance of the rate input signal can now be recognized. It will be seen that a higher correction rate has the same effect on the division cycle as does a lower rate input signal, but that this effect takes place more frequently, i.e., at the frequency of the rate input signal. Thus, when a large magnitude error exists, the 70 nanosecond correction takes place as frequently as 230 kHz. With a very small error, the correction takes place at the rate of 7.2 Hz. Because of the fact that the input signal to the variable divider is much greater than the highest rate input signal, the effect appears to be a real-time shift of the output signal, rather than a frequency modulation.

In the performance of the method of this invention using the apparatus described herein, or other apparatus, it will be recognized that considerable flexibility in arranging interconnections between program sources is possible. In the simple case of one master source and two remote sources, for example, where the video signals from the two remotes are to be mixed, the remote sources can be locked individually to the master source. In that event, each remote source is equipped with the receiving, decoding and phase shifting apparatus as represented by units 22–28 of FIG. 2. The master source is provided with two each of units 16–20 and possibly also with two master frame detectors 15, although the output from one master frame detector could be supplied, with suitable buffering or amplification if necessary, to two or more comparators.

Alternatively, one remote source could be synchronized to the other remote source which, in turn, could be synchronized to the master. This arrangement could be convenient if a newsworthy event is taking place in, for example, Connecticut, at two points so that a mobile crew is sent to one point and a related program is produced simultaneously at a studio near the event, this studio to be regarded than as a second "remote" source. The combined results of these programs are to be sent to, for example, a New York city studio (the master source) for transmission over a nationwide network selectively mixed with commentary from the New York studio. All three sources are to be synchronized, in which case the alternative approach could be more advantageous. In this arrangement it would be necessary to provide both of the master and the studio remote sources with the frame detection, time comparison and other units equivalent to units 15–20 of FIG. 2, the two remote sources being provided with equipment equivalent to units 22–28.

While an advantageous embodiment has been chosen to illustrate the invention, it will be understood by those skilled in the art that various changes and modifications can be made therein without departing from the scope of the invention as defined in the appended claims.

What is claimed is:

1. In an apparatus for synchronizing video signals in a television system of the type having first and second sources of video signals, which signals each include a plurality of groups of pulses with each group containing a series of synchronizing pulses, at least one of the synchronizing pulses in each group being independently identifiable by a unique time location characteristic, the combination of first-means for receiving the video signal from the first source, detecting in selected representative groups of pulses in that signal one pulse having a common identifiable unique time location characteristic in each of said groups, and generating a pulse representative of the time location of said one pulse;

second means for receiving the video signal from the second source, detecting in selected representative groups of pulses in that signal one pulse having a common identifiable unique time location characteristic in each of said groups, and generating a pulse representative of the time location of said one pulse, said unique time location characteristic of said one pulse detected from the video signal from said second source being the same as said unique time location characteristic of said one pulse detected from the video signal from said first source;

third means for comparing the pulses generated by said first and second means and producing a signal having a characteristic representative of the time separation thereof, said third means comprising means for comparing said pulses generated by said first and second means to determine the order of and time interval between said pulses, and means for generating an encodable signal representative of the order and time interval so determined;

signal generating means for generating an audio frequency signal representative of the signal produced by said third means, said signal generating means having an output connectable to an audio frequency transmission line for transmitting said audio frequency signal to one of the first and second sources of video signals;

fourth means connectable to the transmission line at said one source for receiving said audio frequency signal and providing therefrom a signal representative of the time separation of the pulses generated by said first and second means;

fifth means responsive to the signal provided by said fourth means for altering the time location of the synchronizing pulses of the video signal from said one source to decrease the time separation between said one pulse in the signal from the first source and said one pulse in the signal from the second source;

digital coding means for converting said encodable signal into a binary word containing a plurality of coded bits representative of said time interval;

means for sensing the presence of video signals from the first and second sources of video signals; and means for preventing the passage of a binary word in response to absence of a video signal from one of the sources.

2. Apparatus according to claim 1, wherein said signal generating means comprises a plurality of gated oscillator means for receiving said binary coded word and generating audio frequency signals representative thereof, and amplifier means for amplifying said audio frequency signals to a level suitable for transmission via an audio frequency transmission line.

3. Apparatus according to claim 2, wherein said fourth means comprises audio detector means for detecting the audio frequency signals so transmitted and for generating a plurality of pulse outputs representative of both said binary word and the order of said pulses generated by said first and second means, and decoding means having a plurality of output terminals for producing a signal at one of said output terminals, the one of said terminals at which said signal appears being determined by the permutation of pulses generated by said audio detector means.

4. Apparatus according to claim 3 wherein said fifth means comprises means for generating a plurality of signals at different frequencies, the number of different frequencies being equal to the number of output terminals of said decoding means;

gating means responsive to an output from said decoding means to select one of said different frequencies and to provide the selected frequency signal at an output terminal; and time shift means for accepting the selected frequency signal and for advancing or retarding individual ones of the synchronizing pulses of the video signal at said one source at a rate determined by the frequency of said selected signal.

5. In an apparatus for synchronizing video signals in a television system of the type having first and second sources of video signals, which signals each include a plurality of groups of pulses with each group containing a series of synchronizing pulses, at least one of the synchronizing pulses in each group being independently identifiable by a unique time location characteristic, the combination of first means for receiving the video signal from the first source, detecting in selected representative groups of pulses in that signal one pulse having a common identifiable unique time location characteristic in each of said groups, and generating a pulse representative of the time location of said one pulse;

second means for receiving the video signal from the second source, detecting in selected representative groups of pulses in that signal one pulse having a common identifiable unique time location characteristic in each of said groups, and generating a pulse representative of the time location of said one pulse, said unique time location characteristic of said one pulse detected from the video signal from said second source being the same as said unique time location characteristic of said one pulse detected from the video signal from said first source;

third means for comparing the pulses generated by said first and second means and producing a signal having a characteristic representative of the time separation thereof;

signal generating means for generating an audio frequency signal representative of the signal produced by said third means, said signal generating means having an output connectable to an audio frequency transmission line for transmitting said audio frequency signal to one of the first and second sources of video signals;

fourth means connectable to the transmission line at said one source for receiving said audio frequency signal and providing therefrom a signal representative of the time separation of the pulses generated by said first and second means, said fourth means comprising means to convert said audio frequency signal into a binary word representative of the time separation, said binary word being one of $n$ possible permutations of the bits in said word, each permutation being representative of a different preselected increment of time separation magnitude, and translating means for accepting said binary word and for providing an output signal at one of $n$ output terminals, the one of said $n$ terminals selected being unique to each permutation; and fifth means responsive to the signal provided by said fourth means for altering the time location of the synchronizing pulses of the video signal from said one source to decrease the time separation between said one pulse in the signal from the first source and said one pulse in the signal from the second source, said fifth means comprising a rate output terminal, means for generating a plurality of signals at $n$ different frequencies, a plurality of gating means, each of said gating means being connected to one of said $n$ output terminals and one of said $n$ frequency signals, each of said gating means being responsive to an output signal at its associated output terminal to provide a signal at its associated frequency to said rate output terminal, means for generating an external sync signal at the frequency of equally spaced ones of the synchronizing pulses of the video signal from said one source and for connecting said external sync signal to said one source, said last mentioned means including a variable division ratio frequency divider, and means responsive to the signal at said rate output terminal to vary the division ratio of said divider intermittently at a rate proportional to said time separation magnitude.

6. An apparatus for synchronizing video signals in a system of the type having first and second sources of video signals, the signal from each source including a plurality of synchronizing pulses with at least one pulse in the signal from each source being identifiable by a unique time location characteristic, the apparatus comprising means for receiving video signals from the first source and for generating a pulse representative of the real time location of the at least one unique pulse included in the signals;

means for receiving video signals from the second source and for generating a pulse representative of the real time location of the at least one unique pulse included in the signals;

means for comparing the pulses representative of the real time locations and for producing a pulse the duration of which is proportional to the real time separation thereof;

means for generating an audio frequency signal representative of the duration of said pulse proportional to said time separation, said last mentioned means having output terminals connectable to an audio frequency transmission line for transmitting said audio frequency signal from one to the other of the video source locations;

means connected to other terminals of said transmission line at the other of said locations for receiving said audio frequency signals and for generating coded signals representative of said separation; and means for stepwise altering the time location of the synchronizing pulses included in the video signal produced by the source at said other location to decrease the time separation between said unique pulses from the two sources.

7. In a television system of the type having a master program source for generating video signals which include synchronizing pulses for an interleaved raster, the pulses for the synchronization of the second field including a pulse which is unique in the sense that it has no time counterpart in the pulses for synchronization of the first field, and a remote program source for generating video signals including synchronizing pulses in the same format as in the signals from the master source, and wherein the unique pulse included in the signals from the remote source does not necessarily occur at precisely the same time as the unique pulse included in the signals from the master source at the location of the master source, an apparatus for synchronizing the unique pulses from the two sources comprising the combination of first means for accepting the synchronizing pulses from the master program source and for providing an output signal the significant portion of which consists of the unique one of the synchronizing pulses, said first means including gate circuit means having a conductive and a nonconductive state, and means for rendering said gate circuit means nonconductive in response to pulses in said synchronizing pulses other than said unique pulse, said gate circuit means having a time constant operative to return said gate circuit means to its conductive state a predetermined period of time after entering its nonconductive state;

second means for accepting the synchronizing pulses from the remote program source and for providing an output signal the significant portion of which consists of the unique one of the synchronizing pulses produced by the remote source, said second means comprising gate circuit means having a conductive and a nonconductive state, and means for rendering said gate circuit means nonconductive in response to pulses in said synchronizing pulses other than said unique pulse, said gate circuit means having a time constant operative to return said gate circuit means to its conductive state a predetermined period of time after entering its nonconductive state;

means for accepting the output signals from said first and second means and for producing an error pulse having a duration proportional to the time separation between like portions of said unique pulses;

means for producing a plurality of gauge pulses of different durations, said gauge pulses being sequentially generated to occupy different segments of time, the first of said gauge pulses being initiated at the beginning of said error pulse;

means for determining the number of said gauge pulses which occupy the same time segments as said error pulse;

means for encoding said number in a binary word having *m* bits;

means for generating a plurality of audio frequency signals corresponding to said *m* bits and for providing said signals to an output terminal connectable to a transmission line;

means connectable to said transmission line for receiving said audio frequency signals and for reproducing said binary word;

means for accepting said reproduced binary word and for producing an output signal at one of *n* output terminals, where *n* is an integer less than the number of permutations of *m* bits;

means for producing *n* different electrical signals having *n* different frequencies;

gate means responsive to the output signal produced at said one of said *n* output terminals for providing one of said *n* different signals at a rate output terminal;

means responsive to the signal at said rate output terminal for altering the time location of the synchronizing pulses generated by said remote program source at a rate proportional to the selected one of said *n* frequencies.

8. An apparatus for separating the first equalizing pulse from the second field synchronizing pulses of a video signal and for providing that pulse as a usable output signal comprising the combination of threshold circuit means having an input terminal connectable to a source of video signals and an output terminal for accepting standard television video signals and for separating the horizontal, vertical and equalizing synchronizing pulses from the remaining intelligence contained in said signals and for providing said synchronizing pulses at said output terminal, said synchronizing pulses being characterized by three durations, gate circuit means having two input terminals and an output terminal for providing at its output terminal the desired equalizing pulse in response to all of the desired pulse at one input terminal, an enabling signal at the other input terminal, and no disabling signal, one of said input terminals of said gate circuit means being connected to said output terminal of said threshold circuit means;

ramp circuit means connected to the output terminal of said threshold circuit means for accepting said synchronizing pulses and for producing a plurality of pulses each of which corresponds to one of said synchronizing pulses in relative time relationship to the other ones of said plurality, each of said plurality of pulses having an amplitude proportional to the duration of the corresponding one of the synchronizing pulses;

first level responsive circuit means for accepting the plurality of pulses and for providing pulses representative of only the vertical and horizontal synchronizing pulses;

second level responsive circuit means for accepting the vertical and horizontal pulses from said first level responsive circuit means and for providing pulses representative of only the vertical synchronizing means;

first monostable circuit means connected to the output of said second level responsive circuit means for responding to the first vertical pulse to provide a disabling output signal to said gate circuit means during an entire field except for a time segment including the first equalizing pulse of each field; and second monostable circuit means for providing an enabling pulse to said other input terminal of said gate circuit means in response to the last horizontal synchronizing pulse, the leading edge of said enabling pulse being delayed until after termination of said last horizontal pulse, said enabling pulse being of sufficient duration to bracket the first equalizing pulse of the second field but of insufficient duration to bracket the first equalizing pulse of said first field.

9. An apparatus according to claim 8 wherein said threshold circuit means comprises a differential amplifier having two input terminals and an output terminal, one of said input terminals being connectable to said source of video signals; and a Zener diode connected between the other one of said input terminals and ground, the Zener voltage of said diode being approximately equal to standard black level voltage.

10. Apparatus according to claim 8 wherein said ramp circuit means comprises a transistor having a control electrode and two other electrodes, said control electrode being coupled to said output terminal of said threshold circuit means;

a capacitor connected between said one of said other electrodes and ground; and a resistor connected between one of said other electrodes and a source of DC voltage to form a charging circuit for said capacitor;

said transistor being responsive to each pulse provided by said threshold circuit means to allow said capacitor to accumulate a charge through the charging circuit including said resistor, the maximum voltage developed across said capacitor during each pulse being a function of the pulse duration, thereby providing pulses of different amplitudes.

11. Apparatus according to claim 10 wherein each of said first and second level responsive circuit means comprises a transistor having a base electrode and an emitter electrode;

circuit means coupling the pulses of different amplitudes from said ramp circuit means to the base electrode of said transistor; and first and second resistors connected in series circuit relationship between a source of DC voltage and ground forming a voltage dividing bias circuit, said emitter electrode of said transistor being connected to the junction between said resistors to establish a reference bias level for said transistor to render said transistor nonresponsive to pulses at said base electrode below a preselected level.

References Cited

UNITED STATES PATENTS

| | | |
|---|---|---|
| 2,753,396 | 7/1956 | Gore. |
| 3,435,141 | 3/1969 | Hileman et al. |

RICHARD MURRAY, Examiner

B321

PO-1050
(5/69)

UNITED STATES PATENT OFFICE
CERTIFICATE OF CORRECTION

Patent No. 3,525,808 Dated August 25, 1970

Inventor(s) Buck C. Brown

It is certified that error appears in the above-identified patent and that said Letters Patent are hereby corrected as shown below:

Col. 6, line 44, "horizonttal" should read --horizontal--;

Col. 7, line 60, line should be deleted and replaced with --word having three bits. As will be recognized, eight pos- --;

Col. 11, line 45, line should be deleted and replaced with --76 to a low level (binary 0), thereby permitting no--;

Col. 16, lines 47 and 48, "division cycle within the divider unit and, at the completion a" should be deleted;

Col. 19, line 4, "than" should read --then--.

SIGNED AND
SEALED
NOV 10 1970

(SEAL)
Attest:

Edward M. Fletcher, Jr.
Attesting Officer

WILLIAM E. SCHUYLER, JR.
Commissioner of Patents